(12) United States Patent
Chen et al.

(10) Patent No.: US 11,966,848 B2
(45) Date of Patent: Apr. 23, 2024

(54) VIDEO RETRIEVAL METHOD, AND METHOD AND APPARATUS FOR GENERATING VIDEO RETRIEVAL MAPPING RELATIONSHIP

(71) Applicant: Cambricon Technologies Corporation Limited, Beijing (CN)

(72) Inventors: Tianshi Chen, Beijing (CN); Zhou Fang, Beijing (CN)

(73) Assignee: CAMBRICON TECHNOLOGIES CORPORATION LIMITED, Beijing (CN)

(*) Notice: Subject to any disclaimer, the term of this patent is extended or adjusted under 35 U.S.C. 154(b) by 489 days.

(21) Appl. No.: 16/962,110

(22) PCT Filed: May 17, 2019

(86) PCT No.: PCT/CN2019/087446
§ 371 (c)(1),
(2) Date: Jul. 14, 2020

(87) PCT Pub. No.: WO2019/219083
PCT Pub. Date: Nov. 21, 2019

(65) Prior Publication Data
US 2021/0142069 A1 May 13, 2021

(30) Foreign Application Priority Data

May 18, 2018 (CN) .......................... 201810486460.8
May 18, 2018 (CN) .......................... 201810504948.9
May 25, 2018 (CN) .......................... 201810516305.6

(51) Int. Cl.
*G06N 3/08* (2023.01)
*G06F 16/75* (2019.01)
(Continued)

(52) U.S. Cl.
CPC ............. *G06N 3/084* (2013.01); *G06F 16/75* (2019.01); *G06F 16/7844* (2019.01);
(Continued)

(58) Field of Classification Search
CPC .......... G06N 3/084; G06N 3/08; G06N 3/045; G06N 3/048; G06F 16/75; G06F 16/7844;
(Continued)

(56) References Cited

U.S. PATENT DOCUMENTS 5,430,830 A    7/1995  Frank et al.
7,454,090 B2  11/2008  Wilcock et al.
(Continued)

FOREIGN PATENT DOCUMENTS

CN    1254470 A    5/2000
CN    1256005 A    6/2000
(Continued)

OTHER PUBLICATIONS

EP 19802694.0—Extended EP Search Report, mailed Jan. 28, 2022, 8 pages.
(Continued)

*Primary Examiner* — Charlotte M Baker
(74) *Attorney, Agent, or Firm* — Getech Law LLC; Jun Ye

(57) ABSTRACT

The present disclosure relates to a video retrieval method, a method, system and device for generating a video retrieval mapping relationship, and a storage medium. The video retrieval method comprises: acquiring a retrieval instruction, wherein the retrieval instruction carries retrieval information for retrieving a target frame picture; and obtaining the target frame picture according to the retrieval information and a preset mapping relationship. The method for generating a video retrieval mapping relationship comprises: performing a feature extraction operation on each frame picture in a
(Continued)

video stream by using a feature extraction model so as to obtain a key feature sequence corresponding to each frame picture; inputting the key feature sequence corresponding to each frame picture into a text sequence extraction model for processing so as to obtain a text description sequence corresponding to each frame picture; and constructing a mapping relationship according to the text description sequence corresponding to each frame picture. By means of the video retrieval method and the method for generating a video retrieval mapping relationship provided in the present application, the efficiency of video retrieval can be improved, and human-machine interaction is made more intelligent.

13 Claims, 13 Drawing Sheets

(51) Int. Cl.

| | | |
|---|---|---|
| *G06F 16/783* | (2019.01) | |
| *G06F 16/901* | (2019.01) | |
| *G06F 40/279* | (2020.01) | |
| *G06N 3/084* | (2023.01) | |
| *G06V 10/764* | (2022.01) | |
| *G06V 10/774* | (2022.01) | |
| *G06V 10/82* | (2022.01) | |
| *G06V 20/40* | (2022.01) | |

(52) U.S. Cl.
CPC ........ *G06F 16/9027* (2019.01); *G06F 40/279* (2020.01); *G06N 3/08* (2013.01); *G06V 10/764* (2022.01); *G06V 10/774* (2022.01); *G06V 10/82* (2022.01); *G06V 20/40* (2022.01); *G06V 20/41* (2022.01); *G06V 20/46* (2022.01)

(58) Field of Classification Search
CPC . G06F 16/9027; G06F 40/279; G06V 10/764; G06V 10/774; G06V 10/82; G06V 20/40; G06V 20/41; G06V 20/46
USPC ........................................................ 382/224
See application file for complete search history.

(56) References Cited

U.S. PATENT DOCUMENTS

| 11,250,886 B2* | 2/2022 | Anwar .................. G06V 20/41 |
| 2008/0193016 A1 | 8/2008 | Lim et al. |
| 2009/0024596 A1 | 1/2009 | Basso et al. |
| 2012/0301014 A1 | 11/2012 | Xiao |
| 2016/0328647 A1 | 11/2016 | Lin et al. |

FOREIGN PATENT DOCUMENTS

| CN | 1687929 A | 10/2005 |
| CN | 101281520 A | 10/2008 |
| CN | 101655860 A | 2/2010 |
| CN | 101809598 A | 8/2010 |
| CN | 101872346 A | 10/2010 |
| CN | 102508867 A | 6/2012 |
| CN | 102650993 A | 8/2012 |
| CN | 102663069 A | 9/2012 |
| CN | 103052987 A | 4/2013 |
| CN | 104199931 A | 12/2014 |
| CN | 105100718 A | 11/2015 |
| CN | 105550749 A | 5/2016 |
| CN | 105760472 A | 7/2016 |
| CN | 105894046 A | 8/2016 |
| CN | 106295799 A | 1/2017 |
| CN | 106339484 A | 1/2017 |
| CN | 106557545 A | 4/2017 |
| CN | 106610987 A | 5/2017 |
| CN | 106682731 A | 5/2017 |
| CN | 106910203 A | 6/2017 |
| CN | 106991477 A | 7/2017 |
| CN | 107256424 A | 10/2017 |
| CN | 107704916 A | 2/2018 |
| CN | 107861757 A | 3/2018 |
| CN | 107992329 A | 5/2018 |
| CN | 108038815 A | 5/2018 |

OTHER PUBLICATIONS

EP 19802694.0—Information on Search Strategy, mailed Jan. 28, 2022, 1 page.
CN 201810486460.8—First Office Action, mailed Oct. 21, 2019, 19 pages. (with English translation).
CN 201810516305.6—First Office Action, mailed Aug. 11, 2020, 24 pages. (with English translation).

* cited by examiner

VIDEO RETRIEVAL METHOD, AND METHOD AND APPARATUS FOR GENERATING VIDEO RETRIEVAL MAPPING RELATIONSHIP

RELATED APPLICATIONS

The present disclosure claims priority to: Chinese Patent Application No. 201810516305.6 with the title of "Video Retrieval Method, and Method and Apparatus for Generating Video Retrieval Mapping Relationship" and filed on May 25, 2018, the contents of the aforementioned applications are herein incorporated by reference in their entireties.

The present application claims priority to: Chinese Patent Application No. 201810486460.8 with the title of "Code Storage Device and Method" and filed on May 18, 2018, the contents of the aforementioned applications are herein incorporated by reference in their entireties.

The present application claims priority to: Chinese Patent Application No. 201810504948.9 with the title of "Convolutional Neural Network Processor and Training Method" and filed on May 23, 2018, the contents of the aforementioned applications are herein incorporated by reference in their entireties.

TECHNICAL FIELD

The disclosure relates generally to the field of computer technologies, and more specifically to a video retrieval method, and a method and an apparatus for generating video retrieval mapping relationship.

BACKGROUND

With the continuous advancement of technology, videos are becoming more and more popular. Videos are now used not only in TV series and movies, but also in surveillance devices. However, the duration of a video in a TV series or in a movie is at least a few hours, while the duration of a video in a surveillance device ranges from a few days to several months or even years. In this situation, in the current era of information technology, a large amount of video information is generated, so that looking for the needed shots in the massive videos likes looking for a needle in a haystack.

Taking the TV series as an example, at present, when a user needs to find a needed specific shot in a large amount of videos in a TV series, the user usually needs to traverse all the videos by fast forwarding until the needed shot is found.

However, the above-mentioned retrieval method that the users need to manually fast forward and traverse the videos is inefficient, and in the process of fast forwarding, the user is likely to miss the shot to be searched, resulting in that the human-computer interaction is not intelligent enough.

SUMMARY

In order to solve the above-mentioned technical problems, the present disclosure provides a video retrieval method that can improve intelligence, and a method, an apparatus, a terminal, a device, and a storage medium for generating a video retrieval mapping relationship.

In a first aspect, an embodiment of the present disclosure provides a video retrieval method including:

obtaining a retrieval instruction which carries retrieval information for retrieving a target frame picture; and obtaining the target frame picture according to the retrieval information and a preset mapping relationship, where the mapping relationship includes a correspondence between different text description sequences and frame pictures, where a text description sequence is a sequence of text that can describe content of a frame picture.

In a second aspect, an embodiment of the present disclosure provides a method for generating a video retrieval mapping relationship, which includes:

performing a feature extraction operation on each frame picture in a video stream by a feature extraction model to obtain a key feature sequence corresponding to each frame picture, where the key feature sequence includes one or more key features of the frame picture;

inputting the key feature sequence corresponding to each frame picture into a text sequence extraction model for processing to obtain a text description sequence corresponding to each frame picture, where the text description sequence is a sequence of text that can describe content of a frame picture; and constructing a mapping relationship according to the text description sequence corresponding to each frame picture, where the mapping relationship includes a correspondence between different text description sequences and frame pictures.

In a third aspect, an embodiment of the present disclosure provides an apparatus for generating a video retrieval mapping relationship, which includes:

an extraction module configure to perform a feature extraction operation on each frame picture in a video stream by a feature extraction model to obtain a key feature sequence corresponding to each frame picture, where the key feature sequence includes one or more key features of the frame picture;

a first processing module configured to input the key feature sequence corresponding to each frame picture into a text sequence extraction model for processing to obtain a text description sequence corresponding to each frame picture, where the text description sequence is a sequence of text that can describe content of a frame picture; and a construction module configured to construct a mapping relationship according to the text description sequence corresponding to each frame picture, where the mapping relationship includes a correspondence between different text description sequences and frame pictures.

In a fourth aspect, an embodiment of the present disclosure provides a terminal including a memory and a processor, where the memory stores a computer program, and the following steps may be implemented when the processor performs the computer program:

obtaining a retrieval instruction which carries retrieval information for retrieving a target frame picture; and obtaining the target frame picture according to the retrieval information and a preset mapping relationship, where the mapping relationship includes a correspondence between different text description sequences and frame pictures, where a text description sequence is a sequence of text that can describe content of a frame picture.

In a fifth aspect, an embodiment of the present disclosure provides a device including a memory and a processor, where the memory stores a computer program, and the following steps may be implemented when the processor performs the computer program:

performing a feature extraction operation on each frame picture in a video stream by a feature extraction model to obtain a key feature sequence corresponding to each frame picture, where the key feature sequence includes one or more key features of the frame picture;

inputting the key feature sequence corresponding to each frame picture into a text sequence extraction model for processing to obtain a text description sequence corresponding to each frame picture, where the text description sequence is a sequence of text that can describe content of a frame picture; and constructing a mapping relationship according to the text description sequence corresponding to each frame picture, where the mapping relationship includes a correspondence between different text description sequences and frame pictures.

In a sixth aspect, an embodiment of the present disclosure provides a computer-readable storage medium on which a computer program is stored, where the following steps may be implemented when the processor performs the computer program:

obtaining a retrieval instruction which carries retrieval information for retrieving a target frame picture; and obtaining the target frame picture according to the retrieval information and a preset mapping relationship, where the mapping relationship includes a correspondence between different text description sequences and frame pictures, where a text description sequence is a sequence of text that can describe content of a frame picture.

In a seventh aspect, an embodiment of the present disclosure provides a computer-readable storage medium on which a computer program is stored, where the following steps may be implemented when the processor performs the computer program:

performing a feature extraction operation on each frame picture in a video stream by a feature extraction model to obtain a key feature sequence corresponding to each frame picture, where the key feature sequence includes one or more key features of the frame picture;

inputting the key feature sequence corresponding to each frame picture into a text sequence extraction model for processing to obtain a text description sequence corresponding to each frame picture, where the text description sequence is a sequence of text that can describe content of a frame picture; and constructing a mapping relationship according to the text description sequence corresponding to each frame picture, where the mapping relationship includes a correspondence between different text description sequences and frame pictures.

In an eighth aspect, an embodiment of the present disclosure provides a terminal device for video retrieval, which includes an instruction obtaining apparatus and a processor, where the instruction obtaining apparatus is connected to the processor;

the instruction obtaining apparatus is configured to obtain a retrieval instruction; and the processor is configured to retrieve videos to be retrieved according to the obtained retrieval instruction and a preset mapping relationship to obtain a target frame picture.

In some embodiments of the present disclosure, the retrieval instruction carries retrieval information, and the retrieval information is configured to characterize the target frame picture in the videos to be retrieved; the processor is further configured to parse the retrieval instruction to obtain the retrieval information.

In some embodiments of the present disclosure, the instruction obtaining apparatus includes at least one of a voice recognition sensor, a vision sensor and an interaction device. The voice recognition sensor is configured to obtain a voice signal, where the voice signal is configured to determine the retrieval instruction. The vision sensor is configured to obtain a somatosensory signal, where the somatosensory signal is configured to determine the retrieval instruction. The interaction device is configured to obtain a text signal or a picture signal, where the text signal or the picture signal is configured to determine the retrieval instruction.

In some embodiments of the present disclosure, the processor is further configured to generate and send a request signal according to the obtained retrieval instruction, where the request signal is configured to obtain the mapping relationship from a receiver of the request signal.

In some embodiments of the present disclosure, the mapping relationship includes a correspondence between different text description sequences and frame pictures, where a text description sequence is a sequence of text that can describe content of a frame picture.

In a ninth aspect, an embodiment of the present disclosure provides a device for constructing video retrieval mapping relationship, which includes an extraction module, a first processing module, and a construction module.

The extraction module is configured to perform a feature extraction operation on a plurality of frame pictures in the videos to be retrieved to obtain a key feature sequence corresponding to each frame picture, where the key feature sequence includes one or more key features of the frame picture.

The first processing module is configured to input the key feature sequence corresponding to each frame picture into a text sequence extraction model for processing to obtain a text description sequence corresponding to each frame picture.

The construction module is configured to construct a mapping relationship according to the text description sequence corresponding to each frame picture, where the mapping relationship is used to obtain the target frame picture when the videos to be retrieved are retrieved.

In some embodiments of the present disclosure, the construction module includes a first processing unit, a judgment unit, a segmentation unit, and a mapping unit, where the first processing unit is configured to compute a second correlation according to a text description sequence corresponding to two adjacent pictures in the videos to be retrieved;

the judgment unit is configured to determine a chapter attribute of each frame picture in the videos to be retrieved according to the second correlation;

the segmentation unit is configured to segment the videos to be retrieved according to the chapter attribute of each frame picture in the videos to be retrieved to obtain a tree-like directory structure; and the mapping unit is configured to construct the mapping relationship according to the tree-like directory structure and the text description sequence corresponding to each frame picture.

In some embodiments of the present disclosure, the first processing unit includes a word segmentation subunit, a processing subunit, and a judgment subunit; where the word segmentation subunit is configured to perform a word segmentation operation on each text description sequence to obtain a word segmentation result corresponding to each text description sequence, where the word segmentation result includes a plurality of segmented words;

the processing subunit is configured to determine a label corresponding to each word segmentation result according to the word segmentation result corresponding to each text description sequence, where the label includes at least one of a people label, a time label, a place label, and an event label; and the judgment subunit is configured to compute whether a word segmentation result of the text description sequence corresponding to a previous frame picture set and the word segmentation result of the text description sequence corresponding to the next frame picture set under each label are the same, and is configured to determine a second correlation between the text description sequence corresponding to the previous frame picture set and the text description sequence corresponding to the next frame picture set according to a judgment result.

In some embodiments of the present disclosure, the judgment unit includes a first judgment subunit and a second judgment subunit, where the first judgment subunit is configured to determine that the text description sequence corresponding to the previous frame picture set and the text description sequence corresponding to the next frame picture set belong to a same section in the tree-like directory structure when the second correlation is greater than or equal to a first threshold; and the second judgment subunit is configured to determine that the text description sequence corresponding to the previous frame picture set and the text description sequence corresponding to the next frame picture set belong to different sections in a same chapter in the tree-like directory structure when the second correlation is greater than a second threshold and less than the first threshold.

Compared with the traditional retrieval method that the users need to manually fast forward and traverse the videos, by adopting a video retrieval method, and a method, an apparatus, a terminal, a device, and a storage medium for generating a video retrieval mapping relationship provided by the present disclosure, when the terminal is retrieving, only the retrieval information of the target frame picture is needed to obtain the target frame picture needed to be retrieved. In other words, adopting the video retrieval method, and the method for generating video retrieval mapping relationship provided by the embodiments of the present disclosure can improve the efficiency of video retrieval. Moreover, by adopting the video retrieval method, and the method for generating a video retrieval mapping relationship provided by the embodiments of the present disclosure, a situation where the users are likely to miss a shot to be searched during manually fast forward and traverse the videos in the traditional technology can be avoided. All in all, adopting the video retrieval method, and the method for generating a video retrieval mapping relationship provided by the embodiments of the present disclosure can improve human-computer interaction intelligence.

In a tenth aspect, an embodiment of the present disclosure provides an encoding and storage apparatus of convolutional neural network, which includes a storage module and an encoding module. The encoding module includes a comparator and an encoder, where the comparator is configured to compare input data of an activation layer with reference data, and the encoder is configured to encode input data or output data of the activation layer according to a comparison result.

In some embodiments, the storage module is configured to store an encoding result in a feature map, store the comparison result, and store a parameter α of an activation function.

In some embodiments, the reference data is a constant or output data of the activation layer.

In some embodiments, if the activation function is a ReLU (Rectified Linear Unit) or a Leaky ReLU (Leaky Rectified Linear Unit), the reference data is the output data of the activation layer, where if the input data and output data of the activation layer are equal, the output data is encoded as 1; if the input data and output data of the activation layer are not equal, the output data is encoded as 0; or the reference data is a constant, and the value of the constant is 0, where if the input data is greater than 0, the input data is encoded as 1; and if the input data is smaller than or equal to 0, the input data is encoded as 0.

In some embodiments, the encoding adopts 0/1 encoding and encoded data is stored in bits.

In an eleventh aspect, an embodiment of the present disclosure provides a processor of convolutional neural network, which includes the encoding and storage apparatus, where the processor of convolutional neural network further includes:

a computation module configured to perform a forward propagation operation and a back propagation operation; where when performing the forward propagation operation, the computation module is configured to compute the output data of the activation layer after being processed by the activation function according to the input data of the activation layer; and where when performing the back propagation operation, the computation module is configured to process a partial derivative according to the encoding result.

In some embodiments, the processor further includes an I/O module used for data transfer between an activation layer and adjacent layers, data transfer between the storage module and the computation module, and data input and output of the encoding and storage apparatus.

In some embodiments, a formula of computing the output data of the activation layer after being processed by the activation function according to the input data of the activation layer is:

$$f(x)=\max(x,\alpha x),$$

where x represents the input data of the activation layer, f (x) represents the output data of the activation layer, and α represents the parameter of the activation function; and the activation function is a ReLU (Rectified Linear Unit) or a Leaky ReLU (Leaky Rectified Linear Unit).

In some embodiments, the activation function is ReLU, and the value of a is in the range of 0~0.35.

In some embodiments, when performing the back propagation operation, the computation module is configured to process a partial derivative according to the encoding result. If the encoding result is 1, a current partial derivative dy is not processed, and the dy is directly transferred to the I/O module; if the encoding result is 0, the current partial derivative dy is multiplied by the parameter α of the activation function to obtain $dy_1$, and then the obtained $dy_1$ is transferred to the I/O module.

In a twelfth aspect, an embodiment of the present disclosure provides an encoding and storage method of convolutional neural network, which includes:

comparing input data of an activation layer with reference data; and encoding input data or output data of the activation layer according to a comparison result.

In some embodiments, the encoding and storage method of convolutional neural network further includes: storing the comparison result, an encoding result, and a parameter α of an activation function, where the encoding result is stored in a feature map.

In some embodiments, the reference data is a constant or output data of the activation layer.

In some embodiments, the reference data is the output data of the activation layer, where if the input data and output data of the activation layer are equal, the output data is encoded as 1; if the input data and output data of the activation layer are not equal, the output data is encoded as 0; or the reference data is a constant, and the value of the constant is 0, where if the input data is greater than 0, the input data is encoded as 1; and if the input data is smaller than or equal to 0, the input data is encoded as 0.

In a thirteenth aspect, an embodiment of the present disclosure provides a training method of convolutional neural network, which includes:

when performing a forward propagation operation, computing the output data of the activation layer after being processed by the activation function according to the input data of the activation layer; and when performing a back propagation operation, obtaining an encoding result corresponding to a current partial derivative, and performing a partial derivative operation according to the encoding result.

In some embodiments, the training method further includes: outputting an operation result.

In some embodiments, in the step of obtaining the encoding result corresponding to the current partial derivative, a code of the feature map in corresponding position can be obtained according to the position of the current partial derivative dy, where the position of the current partial derivative dy can be obtained according to a relative address of a matrix or an array.

In some embodiments, a formula of computing the output data of the activation layer after being processed by the activation function according to the input data of the activation layer is:

$$f(x)=\max(x,\alpha x),$$

where x represents the input data of the activation layer, f(x) represents the output data of the activation layer, and α represents the parameter of the activation function; and the activation function is a ReLU (Rectified Linear Unit) or a Leaky ReLU (Leaky Rectified Linear Unit).

In some embodiments, in the step of processing the partial derivative according to the encoding result, if the encoding result is 1, a current partial derivative dy is not processed, and the dy is directly transferred to the I/O module; if the encoding result is 0, the current partial derivative dy is multiplied by the parameter α of the activation function to obtain $dy_1$, and then the obtained $dy_1$ is transferred to the I/O module.

In a fourteenth aspect, an embodiment of the present disclosure provides a chip including the encoding and storage apparatus of convolutional neural network or the processor of convolutional neural network.

In a fifteenth aspect, an embodiment of the present disclosure provides an electronic device including the chip.

Technical Effects

It can be seen from the technical solutions that the apparatus and method for encoding and storage of convolutional neural network, the processor of convolutional neural network and the training method of convolutional neural network provided by the present disclosure have at least one of the following technical effects:

1. By adopting the apparatus and method for encoding and storage, the processor and the training method provided by the present disclosure, there is no need to modify any parameters that affect the prediction result, so that the accuracy of predicting the convolutional neural network will not be affected.

2. Since the input and output of the activation layer have been compared during forward propagation, only the encoding result needs to be judged during back propagation, there is no need to call the input results and output results of the activation layer during forward propagation to select the partial derivative. Therefore, the present disclosure reduces the count of input and output to the memory and optimizes the performance of the convolutional neural network.

3. The present disclosure encodes and stores the data in the feature map of the activation layer, compresses the 32-bit floating-point data to 1-bit floating-point data, which effectively saves memory.

In order to solve or at least partially alleviate the above-mentioned technical problems, the present disclosure provides another processor of convolutional neural network, another training method of convolutional neural network, and another encoding and storage apparatus.

In a sixteenth aspect, an embodiment of the present disclosure provides a processor of convolutional neural network, which includes:

an encoding module configured to encode input data or output data of an activation layer; and a computation module connected to the encoding module, configured to perform a forward propagation operation and a back propagation operation, where when performing the back propagation operation, the computation module is configured to process a partial derivative according to an encoding result.

In some embodiments, when performing the forward propagation operation, the computation module is configured to compute the output data of the activation layer after being processed by the activation function according to the input data of the activation layer.

In some embodiments, the processor further includes a storage module configured to store the encoding result to a feature map.

In some embodiments, the processor further includes an I/O module used for data transfer between the activation layer and the adjacent layers, and data input and output between the storage module and the computation module.

In some embodiments, the encoding module further includes:

a comparator configured to compare input data of the activation layer with reference data; and an encoder configured to encode input data or output data of the activation layer according to a comparison result.

In some embodiments, the reference data is a constant or output data of the activation layer.

In some embodiments, the reference data is the output data of the activation layer, where if the input data and output data of the activation layer are equal, the output data is encoded as 1; if the input data and output data of the activation layer are not equal, the output data is encoded as 0; or the reference data is a constant, and the value of the constant is 0, where if the input data is greater than 0, the input data is encoded as 1; and if the input data is smaller than or equal to 0, the input data is encoded as 0.

In some embodiments, the encoding adopts 0/1 encoding and the encoded data is stored in bits.

In some embodiments, a formula of computing the output data of the activation layer after being processed by the activation function according to the input data of the activation layer is:

$$f(x)=\max(x,\alpha x),$$

where x represents the input data of the activation layer, f (x) represents the output data of the activation layer, and α represents the parameter of the activation function; and the activation function is a ReLU (Rectified Linear Unit) or a Leaky ReLU (Leaky Rectified Linear Unit).

In some embodiments, the activation function is ReLU, and the value of a is in the range of 0~0.35.

In some embodiments, when performing the back propagation operation, the computation module is configured to process a partial derivative according to the encoding result. If the encoding result is 1, a current partial derivative dy is not processed, and the dy is directly transferred to the I/O module; if the encoding result is 0, the current partial derivative dy is multiplied by the parameter α of the activation function to obtain $dy_1$, and then the obtained $dy_1$ is transferred to the I/O module.

In a seventeenth aspect, an embodiment of the present disclosure provides a chip including the processor of convolutional neural network.

In an eighteenth aspect, an embodiment of the present disclosure provides an electronic device including the chip.

In a nineteenth aspect, an embodiment of the present disclosure provides a training method of convolutional neural network, which includes:

encoding, by an encoding module, input data or output data of an activation layer; and when performing the back propagation operation, obtaining an encoding result corresponding to a current partial derivative, and performing a partial derivative operation according to the encoding result.

In some embodiments, the training method further includes:

when performing the back propagation operation, computing, by the computation module, the output data of the activation layer after being processed by the activation function according to the input data of the activation layer.

In some embodiments, the training method further includes: storing the encoding result to a feature map after encoding.

In some embodiments, the encoding module encoding the input data or the output data of the activation layer includes:

comparing input data of the activation layer with reference data; and encoding input data or output data of the activation layer according to a comparison result.

In some embodiments, the reference data is a constant or output data of the activation layer.

In some embodiments, the reference data is the output data of the activation layer, where if the input data and output data of the activation layer are equal, the output data is encoded as 1; if the input data and output data of the activation layer are not equal, the output data is encoded as 0; or the reference data is a constant, and the value of the constant is 0, where if the input data is greater than 0, the input data is encoded as 1; and if the input data is smaller than or equal to 0, the input data is encoded as 0.

In some embodiments, in the step of obtaining the encoding result corresponding to the current partial derivative, a code of the feature map in corresponding position can be obtained according to the position of the current partial derivative dy, where the position of the current partial derivative dy can be obtained according to a relative address of a matrix or an array.

In some embodiments, a formula of computing the output data of the activation layer after being processed by the activation function according to the input data of the activation layer is:

$$f(x)=\max(x,\alpha x),$$

where x represents the input data of the activation layer, f (x) represents the output data of the activation layer, and α represents the parameter of the activation function; and the activation function is a ReLU (Rectified Linear Unit) or a Leaky ReLU (Leaky Rectified Linear Unit).

In some embodiments, in the step of processing the partial derivative according to the encoding result, if the encoding result is 1, a current partial derivative dy is not processed, and the dy is directly transferred to the I/O module; if the encoding result is 0, the current partial derivative dy is multiplied by the parameter α of the activation function to obtain $dy_1$, and then the obtained $dy_1$ is transferred to the I/O module.

In a twentieth aspect, an embodiment of the present disclosure provides an encoding and storage apparatus of convolutional neural network, which includes a storage module and an encoding module. The encoding module includes a comparator and an encoder, where the comparator is configured to compare input data of an activation layer with reference data, and the encoder is configured to encode input data or output data of the activation layer according to a comparison result.

In some embodiments, the storage module is configured to store an encoding result in a feature map, store the comparison result, and store a parameter α of an activation function.

In some embodiments, the reference data is a constant or output data of the activation layer.

In some embodiments, if the activation function is a ReLU (Rectified Linear Unit) or a Leaky ReLU (Leaky Rectified Linear Unit), the reference data is the output data of the activation layer, where if the input data and output data of the activation layer are equal, the output data is encoded as 1; if the input data and output data of the activation layer are not equal, the output data is encoded as 0; or the reference data is a constant, and the value of the constant is 0, where if the input data is greater than 0, the input data is encoded as 1; and if the input data is smaller than or equal to 0, the input data is encoded as 0.

In some embodiments, the encoding adopts 0/1 encoding and the encoded data is stored in bits.

In a twenty-first aspect, an embodiment of the present disclosure provides a processor of convolutional neural network, which includes the encoding and storage apparatus, where the processor of convolutional neural network further includes:

a computation module configured to perform a forward propagation operation and a back propagation operation, where when performing the forward propagation operation, the computation module is configured to compute the output data of the activation layer after being processed by the activation function according to the input data of the activation layer; and where when performing the back propagation operation, the computation module is configured to process a partial derivative according to the encoding result.

In some embodiments, the processor further includes an I/O module used for data transfer between the activation layer and the adjacent layers, data transfer between the storage module and the computation module, and data input and output of the encoding and storage apparatus.

In some embodiments, the processor further includes an I/O module used for data transfer between the activation layer and the adjacent layers, data transfer between the storage module and the computation module, and data input and output of the encoding and storage apparatus.

In some embodiments, a formula of computing the output data of the activation layer after being processed by the activation function according to the input data of the activation layer is:

$$f(x)=\max(x,\alpha x),$$

where x represents the input data of the activation layer, f (x) represents the output data of the activation layer, and α represents the parameter of the activation function; and the activation function is a ReLU (Rectified Linear Unit) or a Leaky ReLU (Leaky Rectified Linear Unit).

In some embodiments, the activation function is ReLU, and the value of a is in the range of 0~0.35.

In some embodiments, when performing the back propagation operation, the computation module is configured to process a partial derivative according to the encoding result. If the encoding result is 1, a current partial derivative dy is not processed, and the dy is directly transferred to the I/O module; if the encoding result is 0, the current partial derivative dy is multiplied by the parameter α of the activation function to obtain $dy_1$, and then the obtained $dy_1$ is transferred to the I/O module.

A twenty-second aspect, an embodiment of the present disclosure provides an encoding and storage method of convolutional neural network, which includes:

comparing input data of an activation layer with reference data; and encoding input data or output data of the activation layer according to a comparison result.

In some embodiments, the encoding and storage method of convolutional neural network further includes: storing the comparison result, an encoding result, and a parameter α of an activation function, where the encoding result is stored in a feature map.

In some embodiments, the reference data is a constant or output data of the activation layer.

In some embodiments, the reference data is the output data of the activation layer, where if the input data and output data of the activation layer are equal, the output data is encoded as 1; if the input data and output data of the activation layer are not equal, the output data is encoded as 0; or the reference data is a constant, and the value of the constant is 0, where if the input data is greater than 0, the input data is encoded as 1; and if the input data is smaller than or equal to 0, the input data is encoded as 0.

In a twenty-third aspect, an embodiment of the present disclosure provides a training method of convolutional neural network, which includes:

when performing a forward propagation operation, computing the output data of the activation layer after being processed by the activation function according to the input data of the activation layer; and when performing a back propagation operation, obtaining an encoding result corresponding to a current partial derivative, and performing a partial derivative operation according to the encoding result.

In some embodiments, the training method further includes: outputting an operation result.

In some embodiments, in the step of obtaining the encoding result corresponding to the current partial derivative, a code of the feature map in corresponding position can be obtained according to the position of the current partial derivative dy, where the position of the current partial derivative dy can be obtained according to a relative address of a matrix or an array.

In some embodiments, a formula of computing the output data of the activation layer after being processed by the activation function according to the input data of the activation layer is:

$$f(x)=\max(x,\alpha x),$$

where x represents the input data of the activation layer, f (x) represents the output data of the activation layer, and α represents the parameter of the activation function; and the activation function is a ReLU (Rectified Linear Unit) or a Leaky ReLU (Leaky Rectified Linear Unit).

In some embodiments, in the step of processing the partial derivative according to the encoding result, if the encoding result is 1, a current partial derivative dy is not processed, and the dy is directly transferred to the I/O module; if the encoding result is 0, the current partial derivative dy is multiplied by the parameter α of the activation function to obtain dy1, and then the obtained dy1 is transferred to the I/O module.

In a twenty-fourth aspect, an embodiment of the present disclosure provides a chip including the encoding and storage apparatus of convolutional neural network or the processor of convolutional neural network.

In a twenty-fifth aspect, an embodiment of the present disclosure provides an electronic device including the chip.

Technical Effects

It can be seen from the technical solutions that the processor of convolutional neural network and the training method of convolutional neural network provided by the present disclosure have at least one of the following technical effects:

1. By adopting the processor of convolutional neural network and the training method of convolutional neural network provided by the present disclosure, there is no need to modify any parameters that affect the prediction result, so that the accuracy of predicting the convolutional neural network will not be affected.

2. Since the input and output of the activation layer have been compared during forward propagation, only the encoding result needs to be judged during back propagation, there is no need to call the input results and output results of the activation layer during forward propagation to select the partial derivative. Therefore, the present disclosure reduces the count of input and output to the memory and optimizes the performance of the convolutional neural network.

3. The present disclosure encodes and stores the data in the feature map of the activation layer, compresses the 32-bit floating-point data to 1-bit floating-point data, and effectively saves memory.

It should be noted that the above general description and the following detailed description are only exemplary and explanatory and do not limit the present disclosure.

BRIEF DESCRIPTION OF THE DRAWINGS

The drawings herein form part of this specification, showing embodiments conforming to this disclosure and explaining the principles of this disclosure together with the specification.

DETAILED DESCRIPTION OF THE EXAMPLES

Figure 1A:
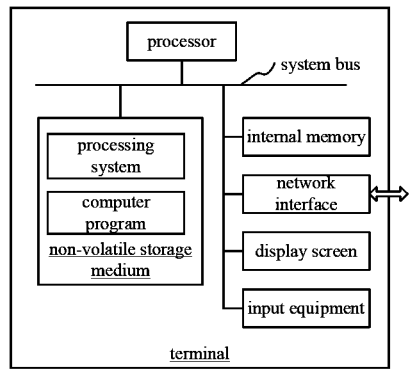
FIG. 1a is a schematic diagram of an internal structure of a terminal provided by an embodiment.

The technical solutions in the embodiments of the present disclosure will be described clearly and in details hereinafter with reference to the accompanied drawings. The embodiments of the present disclosure and the various features and advantageous details of the embodiments are described with reference to the non-limiting embodiments shown in the drawings and in the following description. It should be noted that the features shown in the drawings are not necessarily drawn to scale. The disclosure does not describe the known materials, components, and process techniques so as not to obscure the embodiments of the present disclosure. The examples given are intended only to facilitate the understanding of the implementation of the embodiments of the present disclosure and further enable those skilled in the art to implement the embodiments. These examples should not be construed as limiting the scope of the present disclosure.

Unless otherwise specifically defined, the technical or scientific terms used in this disclosure shall have a general meaning understood by a person of general skill in the field to which this disclosure belongs. The terms such as "first", "second" and the like of the present disclosure are used for distinguishing between different components rather than describing a particular order, quantity or importance. In addition, in each embodiment of the present disclosure, the same or similar reference label represents the same or similar component.

The video retrieval method provided by the embodiment of the present disclosure may be applied to a terminal shown in FIG. 1a. The terminal includes a processor and a memory connected through a system bus. The memory stores a computer program. When the processor executes the computer program, the following steps of the method embodiments may be executed. Optionally, the terminal further incudes a network interface, a display screen, and an input equipment. The processor of the terminal may be configured to provide computing and controlling capabilities. The memory of the terminal may include a nonvolatile storage medium and an internal memory. The nonvolatile storage medium may have an operating system and a computer program. The internal memory may provide an environment for the running of the operating system and the computer program in the nonvolatile storage medium. The network interface of the terminal may be configured to communicate with an external terminal via a network. Optionally, the terminal may be a mobile terminal, a portable device, and other electronic devices that have data processing functions and can interact with external devices or users, such as a television, a digital projector, a tablet, a mobile phone, a personal computer, and a DVD (Digital Video Disc) Player etc. The embodiments of the present disclosure do not limit the specific form of the terminal. The input equipment of the terminal may be a touch surface layered on the display screen, and may be a button, a trackball, or a touch pad arranged on a case of the terminal, and may further be a keyboard, a touch pad, and a mouse externally connected to the terminal.

With the development of society, people are increasingly inseparable from videos in their lives. From watching videos on TVs and movie screens in the past to watching videos on terminals (which includes, but is not limited to all kinds of personal computers, laptops, smartphones, tablets, TVs, and TV set-top boxes) now. It can be understood that a video file is composed of a plurality of frame pictures, and when a plurality of frame pictures are played continuously and quickly, the videos we usually watch are formed. In the early days, videos could only be watched frame by frame instead of fast forward. But now, no matter watching videos on TV or watching videos on the terminals, people can fast forward and skip the shots they don't like. In other words, in the traditional technology, if users want to watch a specific shot, they need to manually fast forward to traverse the videos, which is inefficient, and in the process of fast forwarding, the user is likely to miss the shot to be searched, resulting in that the human-computer interaction is not intelligent enough. A video retrieval method, and a method, an apparatus, a terminal, a device, and a storage medium for generating a video retrieval mapping relationship provided by the present disclosure are intended to solve the above technical problems caused by the technical technology.

It should be noted that the execution body of the following method embodiments may be a video retrieval apparatus, and the apparatus may be implemented by software, hardware, or a combination of software and hardware, thereby achieving part or all of the functions of the terminal. The following method embodiments are described by taking an example where the execution body is a terminal.

In order to make the purpose, technical solutions, and advantages of the present disclosure more clear, the disclosure will be further described in detail below in conjunction with the drawings and embodiments. It should be understood that the specific embodiments described herein are only used to explain the present disclosure and are not intended to limit the present disclosure.

Figure 1:
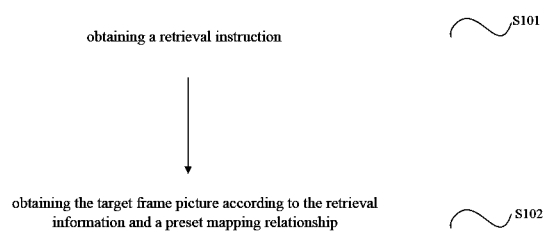
FIG. 1 is a schematic flowchart of a video retrieval method provided by an embodiment.

FIG. 1 is a schematic flowchart of a video retrieval method provided by an embodiment. This embodiment relates to a specific process of a terminal obtaining a target frame picture according to retrieval information in a retrieval instruction and a preset mapping relationship. As shown in FIG. 1, the method includes:

S101: obtaining a retrieval instruction which carries retrieval information for retrieving a target frame picture.

Specifically, the retrieval instruction may be a voice signal obtained by the terminal through a voice recognition sensor, where the voice signal may include description information of a target frame picture; the retrieval instruction may be a somatosensory signal obtained by the terminal through a vision recognition sensor, where the somatosensory signal may include posture information of people in the target frame picture; the retrieval instruction may be a text signal or a picture signal obtained by the terminal through a human-computer interaction interface (such as a touch screen of a mobile phone, etc.), where the text signal may include description information of the target frame picture, and the picture signal may include people, animals, scenery, etc. in the target frame picture.

For example, when the retrieval instruction is the voice signal obtained through the voice recognition sensor, the terminal can recognize the obtained voice signal as text, where the text includes at least one piece of retrieval information for retrieving the target frame picture. When the retrieval instruction is the somatosensory signal obtained through the vision recognition sensor, the terminal can recognize the obtained somatosensory signal as text, where the text includes at least one piece of retrieval information for retrieving the target frame picture. When the retrieval instruction is the text signal or the picture signal obtained through the human-computer interaction interface, the terminal can recognize the obtained text signal or picture signal as text, where the text includes at least one piece of retrieval information for retrieving the target frame picture.

It should be noted that the retrieval instruction may also be other signals obtained by the terminal, as long as the signal carries the retrieval information used to retrieve the target frame picture. For example, the method for obtaining the retrieval instruction may also be a combination of at least the above-mentioned two methods for obtaining the retrieval instruction. The embodiment does not limit the retrieval method and specific form of the retrieval instruction.

The video retrieval method further includes:

S102: obtaining the target frame picture according to the retrieval information and a preset mapping relationship, where the mapping relationship includes a correspondence between different text description sequences and frame pictures, where a text description sequence is a sequence of text that can describe content of the frame picture.

Specifically, the text description sequence is a sequence composed of text that can describe the content of the frame picture. Optionally, the text description sequence may include at least a text description sentence describing the frame picture, where the text description sentence may include a plurality of pieces of text describing the content of the frame picture, and the text description sequence may further include sequences in other forms. Optionally, the text description sentence may include at least one type of text description of people, time, place, and event.

Optionally, the text description of people may describe the number, gender, identity, and/or role of the peoples included in the frame picture; the text description of time may describe seasons, day and night, and/or era where the seasons may be spring, summer, autumn, and winter, and the era can be ancient or modern; the text description of place may describe at least one of the geographic conditions, geomorphic conditions, and special scenes in the frame picture, where the geographic conditions may include cities, towns, and rural areas, and the geomorphic conditions may include grasslands, plains, plateaus, snowfields, etc., and the special scenes may include residences, office buildings, factories, shopping malls, etc.; the text description of event may describe the overall environment of the frame picture, such as wars, sports competitions, etc.

Specifically, the target frame picture includes a frame picture corresponding to the retrieval information retrieved from all frame pictures of the video stream.

It should be noted that the mapping relationship may be embodied in the form of a table or a list, which is not limited in this embodiment. In addition, the mapping relationship can be constructed according to the following embodiments, and the mapping relationship can also be constructed by obtaining priori knowledge from videos and combining the obtained prior knowledge and retrieval information (such as retrieval keywords) into a word vector, or the mapping relationship may be preset directly based on the priori knowledge. It should be noted that this embodiment does not limit the methods for obtaining the mapping relationship.

When specifically implementing the step S102, the terminal retrieves the retrieval information in the text description sequence according to the obtained retrieval information for retrieving the target frame picture. After the text description sequence corresponding to the retrieval information in the retrieval instruction obtained in the step S101 is retrieved, the frame picture corresponding to the text description sequence can be determined according to the mapping relationship, that is, the target frame picture can be obtained. It should be noted that if the retrieval instruction is clear, only one frame picture may be retrieved, and if only one frame picture is retrieved, the frame picture is the target frame picture. However, if the retrieval instruction is fuzzy, a plurality of frame pictures may be retrieved; if scenes represented by a plurality of frame pictures are similar, and text description sequences corresponding to the frame pictures representing similar scenes are relatively similar, then a plurality of frame pictures may also be retrieved. When a plurality of frame pictures are retrieved, the plurality of retrieved frame pictures may be displayed on a display interface of the terminal at the same time for the users to select from; or the plurality of retrieved frame pictures may also be displayed on the display interface of the terminal frame by frame in the order in which a plurality of frame pictures appear in the video for the users to select from. The users can select the frame pictures by pressing a button on the terminal to select a next page/a previous page, or by making gestures or body gestures to select a next page/a previous page. It should be noted that, the embodiment does not limit the method of making the frame picture flip to the next page/the previous page. In addition, when a plurality of frame pictures are retrieved, the embodiment does not limit the method of displaying a plurality of frame pictures on the display interface.

According to the video retrieval method provided by the embodiment, the terminal can obtain the target frame picture needed to be retrieved by the users according to the retrieval information in the obtained retrieval instruction for retrieving the target frame picture and the preset mapping relationship. Compared with the traditional retrieval method that the users need to manually fast forward and traverse the videos, by adopting the video retrieval method provided by the embodiment of the present disclosure, when the terminal is retrieving, only the retrieval information of the target frame picture is needed to obtain the target frame picture needed to be retrieved, that is, the video retrieval method provided by the embodiment of the present disclosure has high efficiency. In addition, by adopting the video retrieval method provided by the embodiments of the present disclosure, a situation where the users are likely to miss a shot to be searched during manually fast forward and traverse the videos in the traditional technology can be avoided, that is, adopting the video retrieval method provided by the embodiments of the present disclosure can improve human-computer interaction intelligence.

Figure 2:
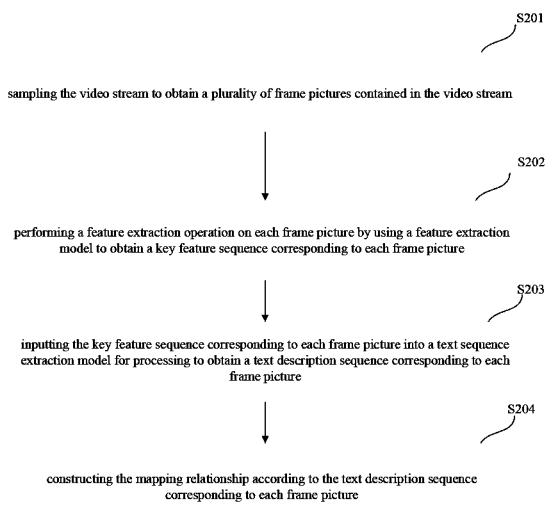
FIG. 2 is a schematic flowchart of a video retrieval method provided by another embodiment.

FIG. 2 is a schematic flowchart of a video retrieval method provided by another embodiment. This embodiment relates to a specific process of the terminal constructing the mapping relationship between the text description sequence and the frame picture. Based on the above-mentioned embodiment, before obtaining the retrieval instruction, the video retrieval method further includes:

S201: sampling the video stream to obtain a plurality of frame pictures contained in the video stream.

Optionally, when the terminal samples the video stream, the sampling frequency may be 1 frame per second or 2 frames per second. The embodiment does not limit the sampling frequency.

The sampling the video stream to obtain a plurality of frame pictures contained in the video stream in the step S201 may reduce the computational complexity of processing the obtained frame pictures in the video stream after sampling in the subsequent steps. Optionally, the video retrieval method provided by the present disclosure may not directly sample the video stream, but directly process the frame pictures in the video stream in the following step:

S202: performing a feature extraction operation on each frame picture by using a feature extraction model to obtain a key feature sequence corresponding to each frame picture, where the key feature sequence includes at least one key feature of the frame picture.

Specifically, the feature extraction model may be a neural network model, where the neural network may be a convolutional neural network model. For example, the convolutional neural network model is used to perform the feature extraction operation on each frame picture, the frame picture is input into the convolutional neural network model, and then the output of the convolutional neural network model is the key feature corresponding to the frame picture, where each frame picture may correspond to at least one key feature, and the at least one key feature may constitute a key feature sequence corresponding to each frame picture. It should be noted that the feature extraction model is not limited in this embodiment, as long as the feature extraction model can output the key feature of the frame picture after a frame picture is input.

The video retrieval method further includes:

S203: inputting the key feature sequence corresponding to each frame picture into a text sequence extraction model for processing to obtain a text description sequence corresponding to each frame picture.

Specifically, the text sequence extraction model may be a neural network model, where the neural network may be a sequence-to-sequence network model. For example, the sequence-to-sequence network model is used to process the key feature sequence. After the key feature sequence corresponding to the frame picture is input to the sequence-to-sequence network model, the sequence-to-sequence network model outputs the text description sequence corresponding to the frame picture. It should be noted that the text sequence extraction model is not limited in this embodiment, as long as the text sequence extraction model can output the text description sequence corresponding to the frame picture after the key feature sequence corresponding to the frame picture is input.

The video retrieval method further includes:

S204: constructing the mapping relationship according to the text description sequence corresponding to each frame picture.

Specifically, according to the step S201 to step S203, the text description sequence corresponding to each frame picture can be obtained, and the mapping relationship between the frame picture and the text description sequence can be constructed according to the correspondence between the frame picture and the text description sequence.

Optionally, in an embodiment, after the step S202: performing a feature extraction operation on each frame picture by using a feature extraction model to obtain a key feature sequence corresponding to each frame picture, the video retrieval method further includes:

computing a first correlation between a key feature sequence corresponding to a previous frame picture set and a key feature sequence corresponding to a next frame picture set.

Specifically, the key feature sequence corresponding to each frame picture can be obtained according to the step S202, where the first correlation between the key feature sequences corresponding to the previous frame picture set and the key feature sequences corresponding to the next frame picture set may be computed according to Euclidean distance, Manhattan distance, or angle cosine. Optionally, the frame picture set may include one frame picture or a plurality of frame pictures, which is not limited in this embodiment. The first correlation is used to represent the similarity between the key feature sequences corresponding to the previous frame picture set and the key feature sequences corresponding to the next frame picture set, where if the key feature sequences corresponding to the previous frame picture set are more similar to the key feature sequences corresponding to the next frame picture set, the first correlation is greater, otherwise, the first correlation is smaller.

It should be noted that the Euclidean distance, Manhattan distance, and angle cosine belong to the method for computing the correlation between two vectors. There are other methods for computing the correlation between the two vectors in addition to the Euclidean distance, Manhattan distance, angle cosine, etc., and the methods will not be listed in this embodiment.

According to the video retrieval method provided by the embodiment of the present disclosure, the terminal performs the feature extraction operation on the frame picture sampled from the video stream by using the feature extraction model to obtain the key feature sequence corresponding to each frame picture, and then the key feature sequence is processed by the text sequence extraction model to obtain the text description sequence corresponding to each frame picture, in this way, the mapping relationship between the frame picture and the text description sequence is constructed. The target frame picture to be retrieved can be obtained according to the retrieval information and the mapping relationship between the frame picture and the text description sequence constructed according to the embodiment. And the obtained target frame picture is more accurate, so as to achieve higher efficiency, and the human-computer interaction is more intelligent.

Figure 3:
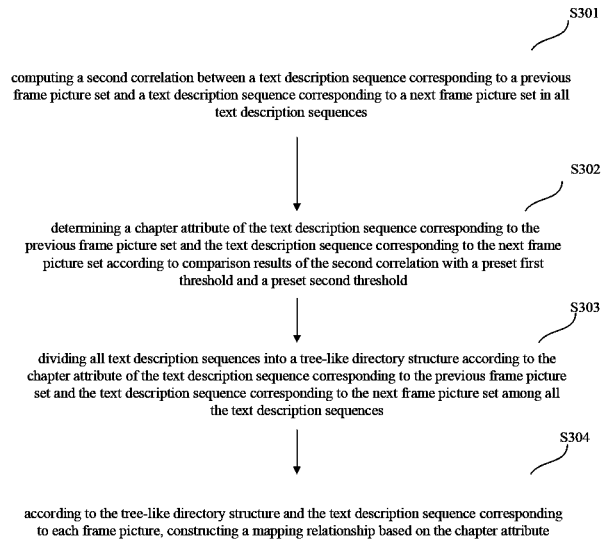
FIG. 3 is a schematic flowchart of a video retrieval method provided by another embodiment.

FIG. 3 is a schematic flowchart of a video retrieval method provided by another embodiment. This embodiment relates to a specific process of constructing the mapping relationship between text description sequence and the frame picture based on the chapter attribute. Based on the above-mentioned embodiment, the constructing the mapping relationship according to the text description sequence corresponding to each frame picture in the step S204 includes:

S301: computing a second correlation between a text description sequence corresponding to a previous frame picture set and a text description sequence corresponding to a next frame picture set in all text description sequences.

Specifically, for the video to be retrieved, the text description sequence corresponding to each frame picture is obtained according to the step S203, and then the second correlation between the text description sequence corresponding to the previous frame picture set and the text description sequence corresponding to the next frame picture set can be computed according to Euclidean distance, Manhattan distance, or angle cosine. The second correlation is used to represent the similarity between the text description sequence corresponding to the previous frame picture set and the text description sequence corresponding to the next frame picture set.

In an optional embodiment, a step of computing the second correlation between the text description sequence corresponding to the previous frame picture set and the text description sequence corresponding to the next frame picture set includes: performing a word segmentation operation on text description sentences in the text description sequence; and then determining the second correlation according to a word segmentation result of the previous frame picture set and the next frame picture set. The specific implementation of this step can be referred to FIG. 4, that is, the step S301 may specifically include the following step:

S401: performing the word segmentation operation on text description sentences in each text description sequence to obtain a word segmentation result corresponding to each text description sequence, where the word segmentation result includes a plurality of segmented words.

Specifically, when the terminal performs the word segmentation operation on the text description sentences in each text description sequence, a word segmentation method based on string matching, a word segmentation method based on understanding, or a word segmentation method based on statistics may be adopted. After the word segmentation operation is performed on the text description sentences, each text description sentence can be segmented into a plurality of separate segmented words, which are the word segmentation result corresponding to the text description sequence. For example, after being performed the word segmentation operation, the text description sentences can be segmented into words of people, time, place, and event. It should be noted that this embodiment does not limit the method of word segmentation operation.

The step S301 further includes the following step:

S402: determining a label corresponding to the word segmentation result of each text description sequence according to the word segmentation result corresponding to each text description sequence, and a mapping relationship between a preset label and the segmented words, where the label includes a people label, a time label, a place label, and an event label.

Specifically, the label includes the people label, the time label, the place label, and the event label. After the step S401 that the word segmentation operation is performed on the text description sentences, the text description sentences are segmented into words of people, time, place, and event. And then, the word segmentation results are matched to the labels according to the mapping relationship between the preset label and the segmented words. For example, if a segmented word is a person's name, the segmented word corresponds to the people label; and if a segmented word is a plateau, the segmented word corresponds to the place label, and so on.

The step S301 further includes the following step:

S403: determining whether a word segmentation result of the text description sequence corresponding to the previous frame picture set is the same as a word segmentation result of the text description sequence corresponding to the next frame picture set under a same label, and according to a judgment result, determining the second correlation between the text description sequence corresponding to the previous frame picture set and the text description sequence corresponding to the next frame picture set.

Specifically, according to the step S402, the word segmentation results of the text description sequence are matched to the labels, in this way, each segmented word is matched to a corresponding label. When each word segmentation result of the text description sequence of the previous frame picture set and the next frame picture set is under a same label, it is determined whether the word segmentation results of the text description sequence corresponding to the two frame picture sets are the same. For example, the second correlation between the text description sequence corresponding to the adjacent two frame picture sets can be obtained according to a ratio of a count of same word segmentation results and a count of different word segmentation results. In other words, the second correlation is used to represent the similarity between the text description sequence corresponding to the previous frame picture set and the text description sequence corresponding to the next frame picture set, where if a probability of the word segmentation results of two adjacent frames of picture sets being the same is greater, the second correlation is greater, and conversely, the second correlation is smaller.

The word segmentation result corresponding to each text description sequence can be obtained according to the steps of S401 to S403, and then the following step S302 is executed:

S302: determining a chapter attribute of the text description sequence corresponding to the previous frame picture set and the text description sequence corresponding to the next frame picture set according to comparison results of the second correlation with a preset first threshold and a preset second threshold.

Specifically, according to the step S301, all the second correlations between the text description sequence corresponding to the previous frame picture set and the text description sequence corresponding to the next frame picture set are obtained, and each second correlation is compared with the first threshold and the second threshold, and then the chapter attribute of the text description sequence corresponding to the previous frame picture set and the text description sequence corresponding to the next frame picture set according to the comparison results of the second correlation with the first threshold and the second threshold. The step S302 can be implemented by the following two possible implementation manners.

Figure 5:
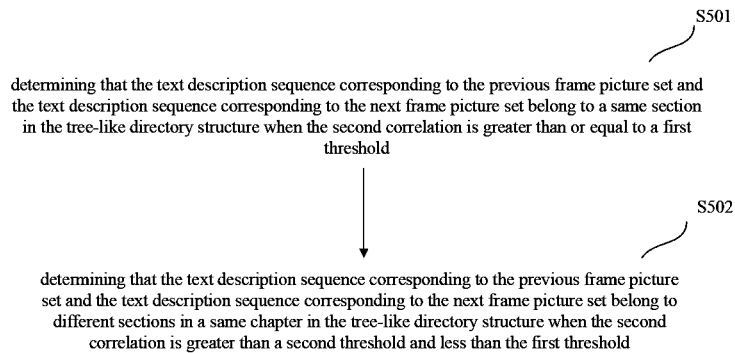
FIG. 5 is a schematic flowchart of a video retrieval method provided by another embodiment.

A first possible implementation manner may be referred to FIG. 5, that is, the step S302 includes the following steps:

S501: determining that the text description sequence corresponding to the previous frame picture set and the text description sequence corresponding to the next frame picture set belong to a same section in the tree-like directory structure when the second correlation is greater than or equal to a first threshold; and S502: determining that the text description sequence corresponding to the previous frame picture set and the text description sequence corresponding to the next frame picture set belong to different sections in a same chapter in the tree-like directory structure when the second correlation is greater than a second threshold and less than the first threshold.

Specifically, the first threshold is a minimum value that can be taken for the second correlation when the text description sequence corresponding to the previous frame picture set and the text description sequence corresponding to the next frame picture set are determined to belong to a same section in the tree-like directory structure; and the first threshold is a maximum value that can be taken for the second correlation when the text description sequence corresponding to the previous frame picture set and the text description sequence corresponding to the next frame picture set are determined to belong to different sections in a same chapter in the tree-like directory structure. The second threshold is a minimum value that can be taken for the second correlation when the text description sequence corresponding to the previous frame picture set and the text description sequence corresponding to the next frame picture set are determined to belong to different sections in a same chapter in the tree-like directory structure.

Based on the above description, it can be understood that in practical applications, a section in the tree-like directory structure can be used to represent a set of adjacent frame pictures with little change of the scenes. The change of scenes of two adjacent picture frame sets in a same chapter in the tree-like directory structure is greater than that of two adjacent picture frame sets in a same section. The scenes may be not change completely in a same chapter in the tree-like directory structure, while when the scenes of two adjacent frame picture sets are completely changed, the two adjacent frame picture sets belong to different chapters in the tree-like directory structure. In other words, the chapters in the tree-like directory structure can be used to represent the degree of change of scenes of two adjacent picture frame sets.

Figure 6:
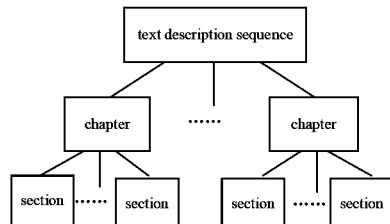
FIG. 6 is a schematic structural diagram of a tree-like directory structure provided by an embodiment.

Optionally, after the chapter attribute of the text description sequence corresponding to the previous frame picture set and the text description sequence corresponding to the next frame picture set among all the text description sequences is determined, as shown in FIG. 6, a structure of chapters of the text description sequence corresponding to all frame pictures is a tree-like directory structure. It can be understood that the tree-like directory structure can also be regarded as a tree-like directory structure of the video to be retrieved.

Figure 7:
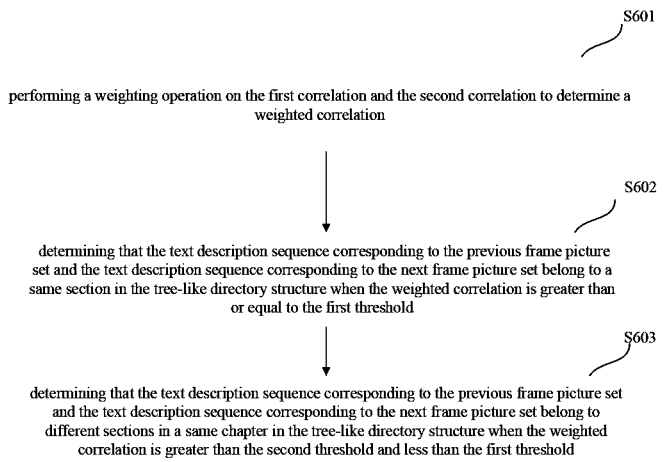
FIG. 7 is a schematic flowchart of a video retrieval method provided by another embodiment.

A second possible implementation manner may be referred to FIG. 7, that is, the step S302 includes the following step:

S601: performing a weighting operation on the first correlation and the second correlation to determine a weighted correlation.

Specifically, the first correlation is used to represent the similarity between the key feature sequences corresponding to the previous frame picture set and the key feature sequences corresponding to the next frame picture set, and the second correlation is used to represent the similarity between the text description sequence corresponding to the previous frame picture set and the text description sequence corresponding to the next frame picture set. According to weights of the first correlation and the second correlation, a weighted sum operation is performed on the first correlation and the second correlation, and a result of the weighted sum operation is determined as the weighted correlation. The weights of the first d correlation and the second correlation can be set separately according to experience; optionally, an initial value may be given first, and an iterative operation is performed, and then corresponding weights can be obtained until an iteration result is converged. It should be noted that this embodiment does not limit the way of obtaining the weights of the first correlation and the second correlation.

The step S302 further includes the following step:

S602: determining that the text description sequence corresponding to the previous frame picture set and the text description sequence corresponding to the next frame picture set belong to a same section in the tree-like directory structure when the weighted correlation is greater than or equal to the first threshold; and S603: determining that the text description sequence corresponding to the previous frame picture set and the text description sequence corresponding to the next frame picture set belong to different sections in a same chapter in the tree-like directory structure when the weighted correlation is greater than the second threshold and less than the first threshold.

Specifically, similar to the determining the chapter attribute of the text description sequence corresponding to the previous frame picture set and the text description sequence corresponding to the next frame picture set among all the text description sequences according to the second correlation, the first threshold and the second threshold, the first threshold is a minimum value that can be taken for the weighted correlation when the text description sequence corresponding to the previous frame picture set and the text description sequence corresponding to the next frame picture set are determined to belong to a same section in the tree-like directory structure; and the first threshold is a maximum value that can be taken for the second correlation when the text description sequence corresponding to the previous frame picture set and the text description sequence corresponding to the next frame picture set are determined to belong to different sections in a same chapter in the tree-like directory structure. The second threshold is a minimum value that can be taken for the second correlation when the text description sequence corresponding to the previous frame picture set and the text description sequence corresponding to the next frame picture set are determined to belong to different sections in a same chapter in the tree-like directory structure.

In this embodiment, the terminal performs the weighting operation on the first correlation and the second correlation to determine the weighted correlation, and determines whether the text description sequence corresponding to the previous frame picture set and the text description sequence corresponding to the next frame picture set belong to a same section in the tree-like directory structure or a same chapter in the tree-like directory structure. In this way, the chapter attribute of the tree-like directory structure of the text description sequence corresponding to the frame pictures can be classified according to the first correlation and the second correlation, so that a more robust division of the text description sequence corresponding to the frame pictures can be obtained.

According to the description of FIG. 5 and FIG. 7, the chapter attribute of the text description sequence corresponding to the previous frame picture set and the text description sequence corresponding to the next frame picture set can be determined. And then, a step S303 to a step S304 are executed:

S303: classifying all text description sequences into a tree-like directory structure according to the chapter attribute of the text description sequence corresponding to the previous frame picture set and the text description sequence corresponding to the next frame picture set among all the text description sequences.

Specifically, as shown in FIG. 6, a specific division process of the tree-like directory structure has been described in detail above and will not be repeated here.

The step S304 includes: according to the tree-like directory structure and the text description sequence corresponding to each frame picture, constructing a mapping relationship based on the chapter attribute.

Specifically, the tree-like directory structure is obtained based on the chapter attribute of the text description sequence corresponding to the previous frame picture set and the text description sequence corresponding to the next frame picture set among all the text description sequences. The sections in the tree-like directory structure include text description sequences corresponding to at least two adjacent frame picture sets, and the chapters in the tree-like directory structure include at least two sections in the tree-like directory structure.

According to the video retrieval method provided by the embodiment of the present disclosure, the terminal computes the second correlation between the text description sequence corresponding to the previous frame picture set and the text description sequence corresponding to the next frame picture set among all the text description sequences, and then compares the second correlation with the preset first threshold and the preset second threshold to determine the chapter attribute of the text description sequence corresponding to the previous frame picture set and the text description sequence corresponding to the next frame picture set, and classifies all the text description sequences into the tree-like directory structure according to the determined chapter attribute, and then constructs the mapping relationship between the tree-like directory structure and the text description sequence corresponding to each frame picture based on the chapter attribute. According to the video retrieval method provided by the embodiment of the present disclosure, by constructing the mapping relationship between the tree-like directory structure and the text description sequence corresponding to each frame picture based on the chapter attribute, when retrieving videos, the terminal can first determine the chapter in the tree-like directory structure corresponding to the retrieval information, and then determines the section in the tree-like directory structure corresponding to the retrieval information in the chapter of the tree-like directory structure. In this way, according to the mapping relationship between the tree-like directory structure and the text description sequences, the text description sequence corresponding to the retrieval information can be determined, and then the target frame picture can be determined, which improves the retrieval speed and retrieval efficiency, and the human-computer interaction intelligence becomes much higher.

Figure 8:
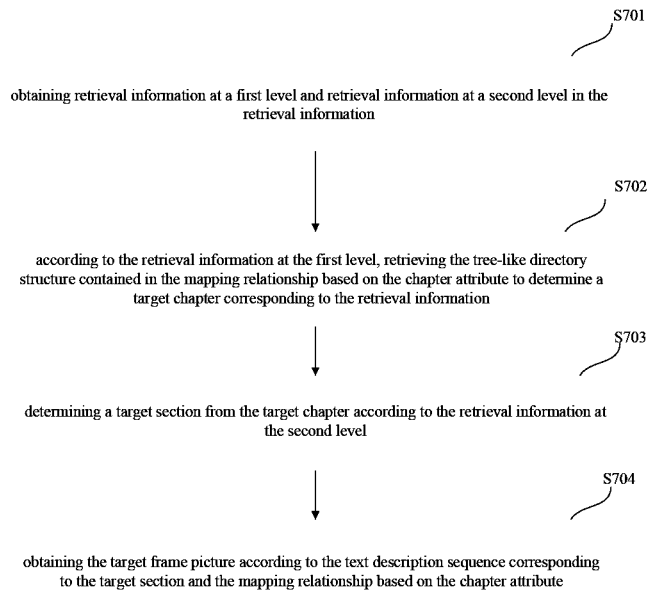
FIG. 8 is a schematic flowchart of a video retrieval method provided by another embodiment.

FIG. 8 is a schematic flowchart of a video retrieval method provided by another embodiment. This embodiment relates to a specific process of obtaining the target frame picture according to the retrieval information and the preset mapping relationship. Based on the above-mentioned embodiment, the obtaining the target frame picture according to the retrieval information and the preset mapping relationship in the step S102 includes:

S701: obtaining retrieval information at a first level and retrieval information at a second level in the retrieval information.

Specifically, the retrieval information can be obtained by analyzing users' voice signals or the users' somatosensory signals, or can be obtained through the human-computer interaction interface. According to a network weight of the obtained retrieval information, the retrieval information is classified into different levels. The retrieval information at the first level is retrieval information that does not have the greatest impact on the correlation between two adjacent frame pictures, and the retrieval information at the second level is retrieval information that has the greatest impact on the correlation between the two adjacent frame pictures. The retrieval information at the first level and the retrieval information at the second level are not absolute, therefore, this embodiment does not limit the retrieval information at the first level and the retrieval information at the second level.

It should be noted that the embodiment does not limit the way of classifying the retrieval information.

The obtaining the target frame picture according to the retrieval information and the preset mapping relationship in the step S102 further includes:

S702: according to the retrieval information at the first level, retrieving the tree-like directory structure contained in the mapping relationship based on the chapter attribute to determine a target chapter corresponding to the retrieval information.

Specifically, in the step S701, the retrieval information is classified into the retrieval information at the first level and the retrieval information at the second level. According to the retrieval information at the first level and the determined tree-like directory structure containing the chapter attribute, the retrieval information at the first level is retrieved in the tree-like directory structure to obtain a chapter of the tree-like directory structure corresponding to the retrieval information at the first level, and the obtained chapter is the target chapter corresponding to the retrieval information. The retrieval methods may include: traversing one by one from a first frame picture of all frame pictures, or traversing from a specific frame picture, and the retrieval methods are not limited in this embodiment.

The obtaining the target frame picture according to the retrieval information and the preset mapping relationship in the step S102 further includes:

S703: determining a target section from the target chapter according to the retrieval information at the second level.

Specifically, the target chapter corresponding to the retrieval information is determined according to the retrieval information at the first level, and according to the retrieval information at the second level, the target chapter is retrieved to obtain a section of the tree-like directory structure corresponding to the retrieval information at the second level, and the obtained section is the target section corresponding to the retrieval information. After the retrieval is performed according to the retrieval information at the first level and the retrieval information at the second level, a plurality of target sections corresponding to the retrieval information may be obtained.

The obtaining the target frame picture according to the retrieval information and the preset mapping relationship in the step S102 further includes:

S704: obtaining the target frame picture according to the text description sequence corresponding to the target section and the mapping relationship based on the chapter attribute.

Specifically, the target section corresponding to the retrieval information is obtained in the step S703, and according to the mapping relationship based on the chapter attribute, the text description sequence corresponding to the target section can be obtained, and then the target frame picture can be obtained according to the frame picture corresponding to the text description sequence corresponding to the target section. If the retrieval information corresponds to a plurality of target sections, the retrieval information corresponds to a plurality of text description sequences, and the retrieval information also corresponds to a plurality of frame pictures, at this time, a plurality of frame pictures can be displayed simultaneously for the users to select the target frame picture.

According to the video retrieval method provided by the embodiment of the present disclosure, the terminal retrieves the tree-like directory structure contained in the mapping relationship based on the chapter attribute according to the retrieval information at the first level of the obtained retrieval information to determine the target chapter corresponding to the retrieval information, and then determines the target section from the target chapter according to the retrieval information at the second level, and finally obtains the target frame picture according to the text description sequence corresponding to the target section and the mapping relationship based on the chapter attribute. According to the video retrieval method provided by the embodiment of the present disclosure, the retrieval information at the first level in the retrieval information obtained by the terminal is retrieved in the tree-like directory structure. The chapter in the tree-like directory structure corresponding to the retrieval information is determined during retrieval process, and then the section in the tree-like directory structure corresponding to the retrieval information at the second level in the retrieval information in the chapter of the tree-like directory structure is determined, therefore, the text description sequence corresponding to the retrieval information are determined according to the mapping relationship between the tree-like directory structure and the text description sequences, and then the target frame picture is determined. In other words, the video retrieval method provided by the embodiment of the present disclosure improves the retrieval speed and retrieval efficiency, and the human-computer interaction intelligence becomes much higher.

Figure 9:
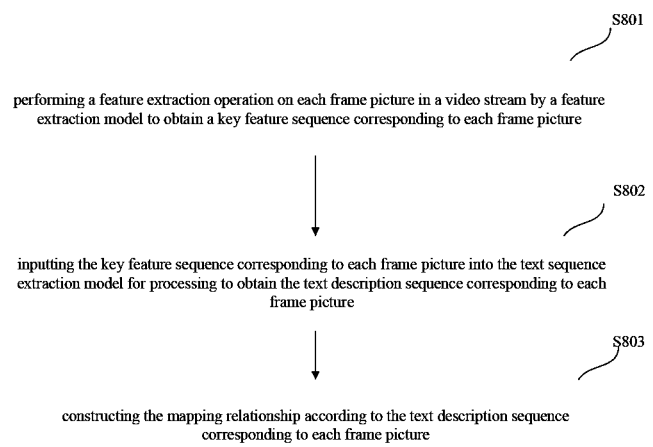
FIG. 9 is a schematic flowchart of a method for generating a video retrieval mapping relationship provided by an embodiment.

FIG. 9 is a schematic flowchart of a method for generating a video retrieval mapping relationship provided by an embodiment. It should be noted that the execution body of the following method embodiments may be the same as the execution body of the above-mentioned method embodiments as a terminal, and the execution body of the following method embodiments may also be a server. The following method embodiments are described by taking the execution body as the server.

This embodiment relates to a specific process of the server constructing the mapping relationship between text description sequences and frame pictures. As shown in FIG. 9, the method for generating a video retrieval mapping relationship includes:

S801: performing a feature extraction operation on each frame picture in a video stream by a feature extraction model to obtain a key feature sequence corresponding to each frame picture, where the key feature sequence includes one or more key features of the frame picture.

Optionally, before using the feature extraction model to perform the feature extraction operation on each frame picture in the video stream, the server can also sample the video stream to obtain a plurality of frame pictures contained in the video stream. The sampling the video stream before the feature extraction operation is performed on each frame picture in the video stream can reduce the operational complexity.

In addition, the specific process of the server using the feature extraction model to perform the feature extraction operation on each frame picture in the video stream to obtain the key feature sequence corresponding to each frame picture is similar to the corresponding process of operating on the terminal. For the specific process, please refer to the embodiment corresponding to FIG. 2, and details are not described herein again.

Before the feature extraction model is used to perform the feature extraction operation on each frame picture in the video stream, the feature extraction model needs to be trained. During the process of training the feature extraction model, when preset training times are reached, adjusting weights and biases in the feature extraction model may be stopped. The specific training process can also refer to the following embodiment.

The method for generating a video retrieval mapping relationship further includes:

S802: inputting the key feature sequence corresponding to each frame picture into the text sequence extraction model for processing to obtain the text description sequence corresponding to each frame picture, where the text description sequence is a sequence of text that can describe content of a frame picture.

Specifically, the specific process of the server inputting a key feature sequence corresponding to each frame picture into a text sequence extraction model for processing to obtain a text description sequence corresponding to each frame picture is similar to the corresponding process of operating on the terminal. For the specific process, please refer to the embodiment corresponding to FIG. 2, and details are not described herein again. The text description sequence can refer to the embodiment corresponding to FIG. 1, which will not be repeated herein.

Before the key feature sequence corresponding to each frame picture is input into the text sequence extraction model for processing, the text sequence extraction model needs to be trained. During the process of training the text sequence extraction model, when a preset training times are reached, adjusting weights and biases in the text sequence extraction model may be stopped. The specific training process can also refer to the following embodiment.

The method for generating video retrieval mapping relationship further includes:

S803: constructing the mapping relationship according to the text description sequence corresponding to each frame picture, where the mapping relationship includes a correspondence between different text description sequences and frame pictures.

Specifically, according to the step S801 to the step S802, the server may obtain the text description sequence corresponding to each frame picture, and construct the mapping relationship between the frame picture and the text description sequence according to the correspondence between the frame picture and the text description sequence.

According to the method for generating video retrieval mapping relationship provided by the embodiment of the present disclosure, the server uses the feature extraction model to perform the feature extraction operation on each frame picture in the video stream to obtain the key feature sequence corresponding to each frame picture, and inputs the obtained key feature sequence corresponding to each frame picture into the text sequence extraction model for processing to obtain the text description sequence corresponding to each frame picture, and finally constructing the mapping relationship according to the text description sequence corresponding to each frame picture, that is, the mapping relationship between the frame picture and the text description sequence is constructed. Compared with the traditional retrieval method that the users need to manually fast forward and traverse the videos, according to the mapping relationship constructed based on the method for generating video retrieval mapping relationship provided by the embodiment of the present disclosure, when the users retrieve the videos on the terminal, the target frame picture needed to be retrieved can be obtained as long as the retrieval information of the target frame picture is input. In other words, according to the mapping relationship constructed based on the method for generating a video retrieval mapping relationship provided by the embodiment of the present disclosure, the video retrieval efficiency can be improved. In addition, according to the mapping relationship constructed based on the method for generating video retrieval mapping relationship provided by the embodiment of the present disclosure, a situation where the users are likely to miss a shot to be searched during manually fast forward and traverse the videos in the traditional technology can be avoided, which can improve human-computer interaction intelligence.

Figure 10:
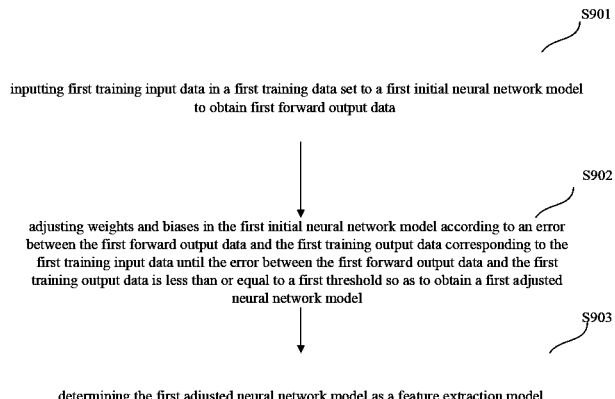
FIG. 10 is a schematic flowchart of a method for generating a video retrieval mapping relationship provided by another embodiment.

FIG. 10 is a schematic flowchart of a method for generating video retrieval mapping relationship provided by a second embodiment. This embodiment relates to a specific process of obtaining a feature extraction model. Based on the above-mentioned embodiment, before performing a feature extraction operation on each frame picture in a video stream by a feature extraction model to obtain a key feature sequence corresponding to each frame picture, as shown in FIG. 10, the method for generating video retrieval mapping relationship further includes:

S901: inputting first training input data in a first training data set to a first initial neural network model to obtain first forward output data, where the first training data set includes the first training input data and first training output data, and the first training input data includes training frame pictures, and the first training output data includes key feature sequences corresponding to the training frame pictures.

Optionally, before the first training input data in the first training data set is input to the first initial neural network model, the first training data set is obtained. Optionally, the first training data set may be obtained from audios or videos stored on the server, or may be obtained from other external devices, which is not limited in this embodiment. The first training data set includes first training input data and first training output data, where the first training input data includes training frame pictures. Optionally, the first training input data may be training frame pictures, and the first training input data may also be training frame pictures and training sound, which is not limited in this embodiment. The first training output data includes key feature sequences corresponding to the training frame pictures. Accordingly, the first training output data may be the key feature sequences corresponding to the training frame pictures, and the first training output data may also be the key feature sequences corresponding to the training frame pictures and the training sound. This embodiment takes that the first training input data is the training frame pictures as an example, and accordingly, this embodiment takes that the first training output data is the key feature sequences corresponding to the training frame pictures as an example.

Specifically, the first initial neural network model includes a plurality of neuron functions, and the first training input data is input to the first initial neural network model. After a forward operation of a plurality of neuron functions is performed on the first training input data, the first initial neural network model outputs first forward output data.

The method for generating video retrieval mapping relationship further includes:

S902: adjusting weights and biases in the first initial neural network model according to an error between the first forward output data and the first training output data corresponding to the first training input data until the error between the first forward output data and the first training output data is less than or equal to a first threshold so as to obtain a first adjusted neural network model; and S903: determining the first adjusted neural network model as a feature extraction model.

Specifically, the error between the first forward output data and the first training output data corresponding to the first training input data is determined according to an error loss function of the first initial neural network, where if the obtained error is greater than the first threshold, the weights and biases in the first initial neural network model are adjusted according to the error until the error between the first forward output data and the first training output data is less than or equal to the first threshold, and then the first adjusted neural network model is obtained. The first adjusted neural network model is determined as the feature extraction model, where the feature extraction model is a trained first initial neural network model.

According to the method for generating a video retrieval mapping relationship provided by the embodiment of the present disclosure, the training frame pictures are input to the first initial neural network model to obtain the first forward output data, and the weights and biases in the first initial neural network model are adjusted according to the error between the first forward output data and the first training output data, and then the feature extraction model is obtained. According to the method for generating a video retrieval mapping relationship provided by the embodiment of the present disclosure, the training frame pictures are taken as the input to obtain the feature extraction model, and then the mapping relationship between the frame picture and the text description sequence is constructed, which makes the retrieval results more accurate when the users performing video retrieval on the terminal.

Figure 11:
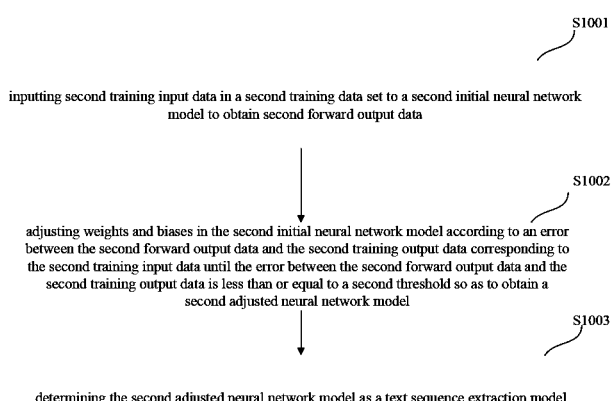
FIG. 11 is a schematic flowchart of a method for generating a video retrieval mapping relationship provided by another embodiment.

FIG. 11 is a schematic flowchart of a method for generating video retrieval mapping relationship provided by another embodiment. This embodiment relates to a specific process of obtaining a text sequence extraction model. Based on the above-mentioned embodiment, before inputting the key feature sequence corresponding to each frame picture into a text sequence extraction model for processing to obtain a text description sequence corresponding to each frame picture, the method for generating video retrieval mapping relationship further includes:

S1001: inputting second training input data in a second training data set to a second initial neural network model to obtain second forward output data, where the second training data set includes second training input data and second training output data, and the second training input data includes training key feature sequences, and the second training output data includes training text description sequence corresponding to the training key feature sequences.

Optionally, before the second training input data in the second training data set is input to the second initial neural network model, the second training data set is obtained. Optionally, the second training data set may be obtained by obtaining the first training output data output by using the feature extraction model on the server, or may be obtained from other external devices, which is not limited in this embodiment. The second training data set includes second training input data and second training output data, where the second training input data includes training key feature sequences. The second training output data includes training text description sequences corresponding to the training key feature sequences.

Specifically, the second initial neural network model includes a plurality of neuron functions, and the second training input data is input to the second initial neural network model. After a forward operation of a plurality of neuron functions is performed on the second training input data, the second initial neural network model outputs second forward output data.

The method for generating video retrieval mapping relationship further includes:

S1002: adjusting weights and biases in the second initial neural network model according to an error between the second forward output data and the second training output data corresponding to the second training input data until the error between the second forward output data and the second training output data is less than or equal to a second threshold so as to obtain a second adjusted neural network model; and S1003: determining the second adjusted neural network model as a text sequence extraction model.

Specifically, the error between the second forward output data and the second training output data corresponding to the second training input data is determined according to an error loss function of the second initial neural network, where if the obtained error is greater than the second threshold, the weights and biases in the second initial neural network model are adjusted according to the error until the error between the second forward output data and the second training output data is less than or equal to the second threshold, and then the second adjusted neural network model is obtained. The second adjusted neural network model is determined as the text sequence extraction model, where the text sequence model is a trained second initial neural network model.

According to the method for generating video retrieval mapping relationship provided by the embodiment of the present disclosure, the training key feature sequences are input to the second initial neural network model to obtain the second forward output data, and the weights and biases in the second initial neural network model are adjusted according to the error between the second forward output data and the second training output data, and then the text sequence extraction model is obtained. According to the method for generating video retrieval mapping relationship provided by the embodiment of the present disclosure, the training key feature sequences are taken as the input to obtain the text sequence extraction model, and then the mapping relationship between the frame picture and the text description sequence is constructed, which makes the retrieval results more accurate when the users performing video retrieval on the terminal.

Optionally, the text description sequence may include at least a text description sentence describing the frame picture, where the text description sentence may include a plurality of pieces of text describing the content of the frame picture. The specific explanation of the text description sequence is the same as the explanation in the video retrieval method, and will not be repeated herein.

Optionally, the text description sentence may include at least one type of text description of people, time, place, and event. The specific explanation of the text description sentence is the same as the explanation in the video retrieval method, and will not be repeated herein.

Optionally, after the feature extraction operation is performed on each frame picture by using the feature extraction model to obtain the key feature sequence corresponding to each frame picture, the video retrieval method further includes: computing the first correlation between the key feature sequence corresponding to the previous frame picture set and the key feature sequence corresponding to the next frame picture set. The method for computing the first correlation is the same as the computation method in the video retrieval method, and details are not described herein.

Optionally, the constructing the mapping relationship according to the text description sequence corresponding to each frame picture includes: computing the second correlation between the text description sequence corresponding to the previous frame picture set and the text description sequence corresponding to the next frame picture set in all text description sequences; determining the chapter attribute of the text description sequence corresponding to the previous frame picture set and the text description sequence corresponding to the next frame picture set according to comparison results of the second correlation with the preset first threshold and the preset second threshold; classifying all text description sequences into the tree-like directory structure according to the chapter attribute of the text description sequence corresponding to the previous frame picture set and the text description sequence corresponding to the next frame picture set among all the text description sequences; and according to the tree-like directory structure and the text description sequence corresponding to each frame picture, constructing a mapping relationship based on the chapter attribute. For the construction of the mapping relationship based on the chapter attribute, please refer to the process of the corresponding embodiment of FIG. 3, and details are not described herein.

Optionally, the computing the second correlation between the text description sequence corresponding to the previous frame picture set and the text description sequence corresponding to the next frame picture set in all text description sequences includes: performing the word segmentation operation on text description sentences in each text description sequence to obtain the word segmentation result corresponding to each text description sequence, where the word segmentation result includes a plurality of segmented words; determining the label corresponding to the word segmentation result of each text description sequence according to the word segmentation result corresponding to each text description sequence, and the mapping relationship between the preset label and the segmented words, where the label includes a people label, a time label, a place label, and an event label; and determining whether the word segmentation result of the text description sequence corresponding to the previous frame picture set is the same as a word segmentation result of the text description sequence corresponding to the next frame picture set under a same label, and according to a judgment result, determining the second correlation between the text description sequence corresponding to the previous frame picture set and the text description sequence corresponding to the next frame picture set. For the computing the second correlation between the text description sequence corresponding to the previous frame picture set and the text description sequence corresponding to the next frame picture set in all text description sequences, please refer to the process of the corresponding embodiment of FIG. 4, and details are not described herein.

Optionally, the determining the chapter attribute of the previous frame picture set and the next frame picture set according to comparison results of the second correlation with the first threshold and the second threshold includes: determining that the text description sequence corresponding to the previous frame picture set and the text description sequence corresponding to the next frame picture set belong to a same section in the tree-like directory structure when the second correlation is greater than or equal to a first threshold; and determining that the text description sequence corresponding to the previous frame picture set and the text description sequence corresponding to the next frame picture set belong to different sections in a same chapter in the tree-like directory structure when the second correlation is greater than a second threshold and less than the first threshold. For the determining the chapter attribute of the previous frame picture set and the next frame picture set, please refer to the process of the corresponding embodiment of FIG. 5, and details are not described herein.

Optionally, the determining the chapter attribute of the previous frame picture set and the next frame picture set according to comparison results of the second correlation with the first threshold and the second threshold includes: performing the weighting operation on the first correlation and the second correlation to determine the weighted correlation; determining that the text description sequence corresponding to the previous frame picture set and the text description sequence corresponding to the next frame picture set belong to a same section in the tree-like directory structure when the weighted correlation is greater than or equal to the first threshold; and determining that the text description sequence corresponding to the previous frame picture set and the text description sequence corresponding to the next frame picture set belong to different sections in a same chapter in the tree-like directory structure when the weighted correlation is greater than the second threshold and less than the first threshold. For the determining the chapter attribute of the previous frame picture set and the next frame picture set according to comparison results of the second correlation with the first threshold and the second threshold, please refer to the process of the corresponding embodiment of FIG. 7, and details are not described herein.

It should be understood that although the steps in the flowcharts of FIG. 1-FIG. 5, FIG. 7, and FIG. 8-FIG. 11 are displayed in order according to the arrows, the steps are not necessarily executed in the order indicated by the arrows. Unless clearly stated in the present disclosure, the execution of these steps is not strictly limited in a specific order, and these steps can be executed in other orders. Moreover, at least some of the steps in FIG. 1-FIG. 5, FIG. 7, and FIG. 8-FIG. 11 may include a plurality of sub-steps or a plurality of stages. These sub-steps or stages are not necessarily executed at the same time, but can be executed at different times. The execution order of the sub-steps or stages is not necessarily sequential, but may be executed in turn or alternately with at least a part of other steps or sub-steps or stages of other steps.

Figure 12:
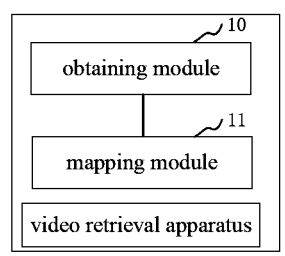
FIG. 12 is a schematic structural diagram of a video retrieval apparatus provided by an embodiment.

As shown in FIG. 12, an embodiment provides a video retrieval apparatus including an obtaining module 10 and a mapping module 11, where the obtaining module 10 is configured to obtain a retrieval instruction which carries retrieval information for retrieving a target frame picture; and the mapping module 11 is configured to obtain the target frame picture according to the retrieval information and a preset mapping relationship, where the mapping relationship includes a correspondence between different text description sequences and frame pictures, where a text description sequence is a sequence of text that can describe content of a frame picture.

The video retrieval apparatus provided by this embodiment can execute the above-mentioned method embodiments, and implementation principles and technical effects are similar, and will not be repeated herein.

In an embodiment, on the basis of the above-mentioned embodiment, the video retrieval apparatus further includes:

a sampling module configured to sample the video stream to obtain a plurality of frame pictures contained in the video stream;

an extraction module A configured to perform the feature extraction operation on each frame picture by using the feature extraction model to obtain the key feature sequence corresponding to each frame picture, where the key feature sequence includes at least one key feature of the frame picture;

a first processing module A configured to input the key feature sequence corresponding to each frame picture into the text sequence extraction model for processing to obtain the text description sequence corresponding to each frame picture; and a construction module A configured to construct the mapping relationship according to the text description sequence corresponding to each frame picture.

The video retrieval apparatus provided by this embodiment can execute the above-mentioned method embodiments, and implementation principles and technical effects are similar, and will not be repeated herein.

Optionally, the text description sequence may include at least a text description sentence describing the frame picture, where the text description sentence may include a plurality of pieces of text describing the content of the frame picture.

Optionally, the text description sentence may include at least one type of text description of people, time, place, and event.

In an embodiment, on the basis of the above-mentioned embodiment, the video retrieval apparatus further includes:

a second processing module B configured to, after the extraction module A performs the feature extraction operation on each frame picture by using the feature extraction model to obtain the key feature sequence corresponding to each frame picture, compute the first correlation between the key feature sequence corresponding to the previous frame picture set and the key feature sequence corresponding to the next frame picture set.

The video retrieval apparatus provided by this embodiment can execute the above-mentioned method embodiments, and implementation principles and technical effects are similar, and will not be repeated herein.

In an embodiment, on the basis of the above-mentioned embodiment, the construction module A is also configured to: compute the second correlation between the text description sequence corresponding to the previous frame picture set and the text description sequence corresponding to the next frame picture set in all text description sequences; determine the chapter attribute of the text description sequence corresponding to the previous frame picture set and the text description sequence corresponding to the next frame picture set according to comparison results of the second correlation with the preset first threshold and the preset second threshold; classify all text description sequences into the tree-like directory structure according to the chapter attribute of the text description sequence corresponding to the previous frame picture set and the text description sequence corresponding to the next frame picture set among all the text description sequences; and according to the tree-like directory structure and the text description sequence corresponding to each frame picture, construct the mapping relationship based on the chapter attribute.

The video retrieval apparatus provided by this embodiment can execute the above-mentioned method embodiments, and implementation principles and technical effects are similar, and will not be repeated herein.

In an embodiment, on the basis of the above-mentioned embodiment, the construction module A is also configured to: perform the word segmentation operation on text description sentences in each text description sequence to obtain the word segmentation result corresponding to each text description sequence, where the word segmentation result includes a plurality of segmented words; determine the label corresponding to the word segmentation result of each text description sequence according to the word segmentation result corresponding to each text description sequence, and the mapping relationship between the preset label and the segmented words, where the label includes a people label, a time label, a place label, and an event label; and determine whether the word segmentation result of the text description sequence corresponding to the previous frame picture set is the same as the word segmentation result of the text description sequence corresponding to the next frame picture set under a same label, and according to the judgment result, determine the second correlation between the text description sequence corresponding to the previous frame picture set and the text description sequence corresponding to the next frame picture set.

The video retrieval apparatus provided by this embodiment can execute the above-mentioned method embodiments, and an implementation principle and technical effects are similar, and will not be repeated herein.

In an embodiment, on the basis of the above-mentioned embodiment, the construction module A is also configured to: determine that the text description sequence corresponding to the previous frame picture set and the text description sequence corresponding to the next frame picture set belong to a same section in the tree-like directory structure when the second correlation is greater than or equal to a first threshold; and determine that the text description sequence corresponding to the previous frame picture set and the text description sequence corresponding to the next frame picture set belong to different sections in a same chapter in the tree-like directory structure when the second correlation is greater than a second threshold and less than the first threshold.

The video retrieval apparatus provided by this embodiment can execute the above-mentioned method embodiments, and implementation principles and technical effects are similar, and will not be repeated herein.

In an embodiment, on the basis of the above-mentioned embodiment, the construction module A is also configured to: perform the weighting operation on the first correlation and the second correlation to determine the weighted correlation; determine that the text description sequence corresponding to the previous frame picture set and the text description sequence corresponding to the next frame picture set belong to a same section in the tree-like directory structure when the weighted correlation is greater than or equal to the first threshold; and determine that the text description sequence corresponding to the previous frame picture set and the text description sequence corresponding to the next frame picture set belong to different sections in a same chapter in the tree-like directory structure when the weighted correlation is greater than the second threshold and less than the first threshold.

The video retrieval apparatus provided by this embodiment can execute the above-mentioned method embodiments, and implementation principles and technical effects are similar, and will not be repeated herein.

In an embodiment, on the basis of the above-mentioned embodiment, the mapping module 11 is also configured to: obtain the retrieval information at the first level and the retrieval information at the second level in the retrieval information; according to the retrieval information at the first level, retrieve the tree-like directory structure contained in the mapping relationship based on the chapter attribute to determine the target chapter corresponding to the retrieval information; determine the target section from the target chapter according to the retrieval information at the second level; and obtain the target frame picture according to the text description sequence corresponding to the target section and the mapping relationship based on the chapter attribute.

The video retrieval apparatus provided by this embodiment can execute the above-mentioned method embodiments, and implementation principles and technical effects are similar, and will not be repeated herein.

Figure 13:
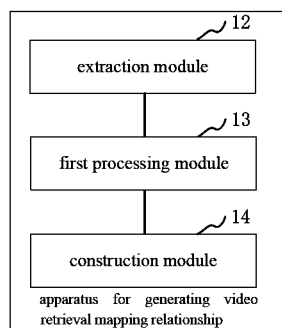
FIG. 13 is a schematic structural diagram of an apparatus for generating video retrieval mapping relationship provided by an embodiment.

As shown in FIG. 13, an embodiment provides an apparatus for generating video retrieval mapping relationship, which includes an extraction module 12, a processing module 13, and an construction module 14, where the extraction module 12 is configured to perform the feature extraction operation on each frame picture in the video stream by using the feature extraction model to obtain the key feature sequence corresponding to each frame picture, where the key feature sequence includes one or more key features of the frame picture;

the processing module 13 is configured to input the key feature sequence corresponding to each frame picture into the text sequence extraction model for processing to obtain the text description sequence corresponding to each frame picture, where the text description sequence is a sequence of text that can describe content of a frame picture; and the construction module 14 is configured to construct the mapping relationship according to the text description sequence corresponding to each frame picture, where the mapping relationship includes the correspondence between different text description sequences and frame pictures.

The apparatus for generating a video retrieval mapping relationship provided by this embodiment can execute the above-mentioned method embodiments, and implementation principles and technical effects are similar, and will not be repeated herein.

Figure 14:
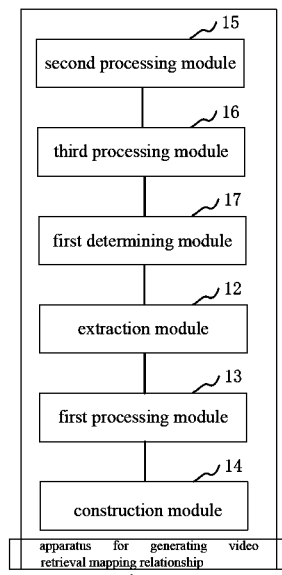
FIG. 14 is a schematic structural diagram of an apparatus for generating video retrieval mapping relationship provided by another embodiment.

In an embodiment, on the basis of the above-mentioned embodiment shown in FIG. 13, as shown in FIG. 14, the apparatus for generating a video retrieval mapping relationship further includes: a second processing module 15, a third processing module 16, and a first determining module 17, where the second processing module 15 is configured to input first training input data in a first training data set to a first initial neural network model to obtain first forward output data, where the first training data set includes the first training input data and first training output data, and the first training input data includes training frame pictures, and the first training output data includes key feature sequences corresponding to the training frame pictures;

the third processing module 16 is configured to adjust weights and biases in the first initial neural network model according to an error between the first forward output data and the first training output data corresponding to the first training input data until the error between the first forward output data and the first training output data is less than or equal to a first threshold so as to obtain a first adjusted neural network model; and the first determining module 17 is configured to determine the first adjusted neural network model as a feature extraction model.

The apparatus for generating a video retrieval mapping relationship provided by this embodiment can execute the above-mentioned method embodiments, and implementation principles and technical effects are similar, and will not be repeated herein.

Figure 15:
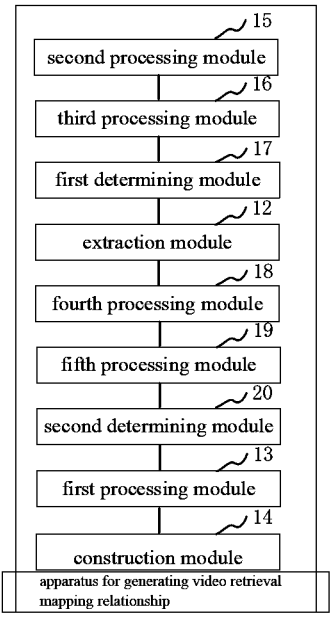
FIG. 15 is a schematic structural diagram of an apparatus for generating video retrieval mapping relationship provided by another embodiment.

In an embodiment, on the basis of the above-mentioned embodiment shown in FIG. 14, as shown in FIG. 15, the apparatus for generating a video retrieval mapping relationship further includes: a fourth processing module 18, a fifth processing module 19, and a second determining module 20, where the fourth processing module 18 is configured to input second training input data in a second training data set to a second initial neural network model to obtain second forward output data, where the second training data set includes second training input data and second training output data, and the second training input data includes training key feature sequences, and the second training output data includes training text description sequence corresponding to the training key feature sequences;

the fifth processing module 19 is configured to adjust weights and biases in the second initial neural network model according to an error between the second forward output data and the second training output data corresponding to the second training input data until the error between the second forward output data and the second training output data is less than or equal to a second threshold so as to obtain a second adjusted neural network model; and the second determining module 20 is configured to determine the second adjusted neural network model as a text sequence extraction model.

The apparatus for generating a video retrieval mapping relationship provided by this embodiment can execute the above-mentioned method embodiments, and implementation principles and technical effects are similar, and will not be repeated herein.

Optionally, the text description sequence may include at least a text description sentence describing the frame picture, where the text description sentence may include a plurality of pieces of text describing the content of the frame picture.

Optionally, the text description sentence may include at least one type of text description of people, time, place, and event.

Figure 16:
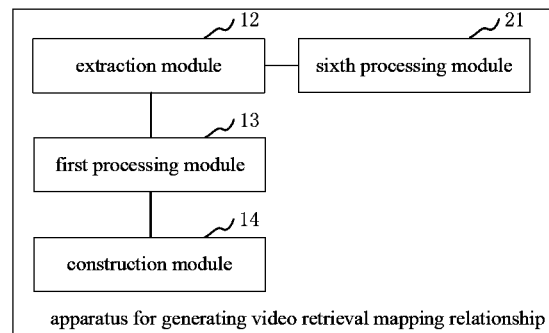
FIG. 16 is a schematic structural diagram of an apparatus for generating video retrieval mapping relationship provided by another embodiment.

In an embodiment, on the basis of the above-mentioned embodiment shown in FIG. 13, as shown in FIG. 16, the apparatus for generating a video retrieval mapping relationship further includes: a sixth processing module 21.

Specifically, the sixth processing module 21 is configured to, after the extraction module 12 performs the feature extraction operation on each frame picture in the video stream by using the feature extraction model to obtain the key feature sequence corresponding to each frame picture, compute the first correlation between the key feature sequence corresponding to the previous frame picture set and the key feature sequence corresponding to the next frame picture set.

The apparatus for generating a video retrieval mapping relationship provided by this embodiment can execute the above-mentioned method embodiments, and implementation principles and technical effects are similar, and will not be repeated herein.

Figure 17:
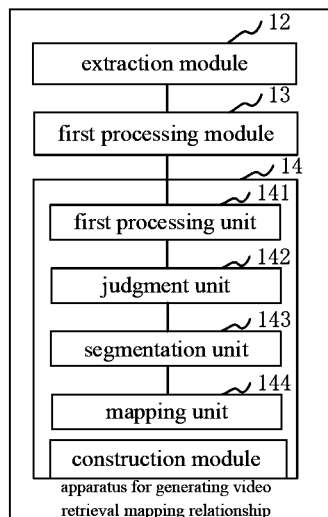
FIG. 17 is a schematic structural diagram of an apparatus for generating a video retrieval mapping relationship provided by another embodiment.

In an embodiment, on the basis of the above-mentioned embodiment shown in FIG. 13, as shown in FIG. 17, the construction module 14 further includes: a first processing unit 141, a judgment unit 142, a segmentation unit 143, and a mapping unit 144.

Specifically, the first processing unit 141 is configured to compute the second correlation between the text description sequence corresponding to the previous frame picture set and the text description sequence corresponding to the next frame picture set in all text description sequences. The judgment unit 142 is configured to determine the chapter attribute of the text description sequence corresponding to the previous frame picture set and the text description sequence corresponding to the next frame picture set according to comparison results of the second correlation with a preset first threshold and a preset second threshold. The segmentation unit 143 is configured to classify all text description sequences into the tree-like directory structure according to the chapter attribute of the text description sequence corresponding to the previous frame picture set and the text description sequence corresponding to the next frame picture set among all the text description sequences. The mapping unit 144 is configured to construct the mapping relationship based on the chapter attribute according to the tree-like directory structure and the text description sequence corresponding to each frame picture.

The apparatus for generating a video retrieval mapping relationship provided by this embodiment can execute the above-mentioned method embodiments, and implementation principles and technical effects are similar, and will not be repeated herein.

Figure 18:
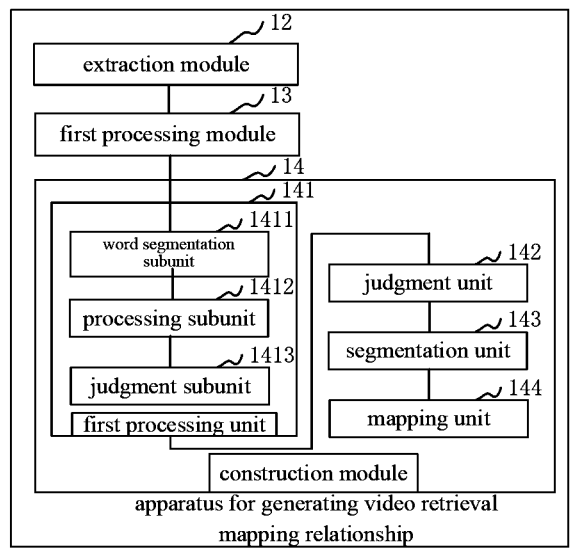
FIG. 18 is a schematic structural diagram of an apparatus for generating a video retrieval mapping relationship provided by another embodiment.

In an embodiment, on the basis of the above-mentioned embodiment shown in FIG. 17, as shown in FIG. 18, the first processing unit 141 further includes: a word segmentation subunit 1411, a processing subunit 1412, and a judgment subunit 1413.

Specifically, the word segmentation subunit 1411 is configured to perform the word segmentation operation on text description sentences in each text description sequence to obtain a word segmentation result corresponding to each text description sequence, where the word segmentation result includes a plurality of segmented words. The processing subunit 1412 is configured to determine the label corresponding to the word segmentation result of each text description sequence according to the word segmentation result corresponding to each text description sequence, and the mapping relationship between the preset label and the segmented words, where the label includes a people label, a time label, a place label, and an event label. The judgment subunit 1413 is configured to determine whether the word segmentation result of the text description sequence corresponding to the previous frame picture set is the same as the word segmentation result of the text description sequence corresponding to the next frame picture set under a same label, and according to the judgment result, determine the second correlation between the text description sequence corresponding to the previous frame picture set and the text description sequence corresponding to the next frame picture set.

The apparatus for generating a video retrieval mapping relationship provided by this embodiment can execute the above-mentioned method embodiments, and implementation principles and technical effects are similar, and will not be repeated herein.

Figure 19:
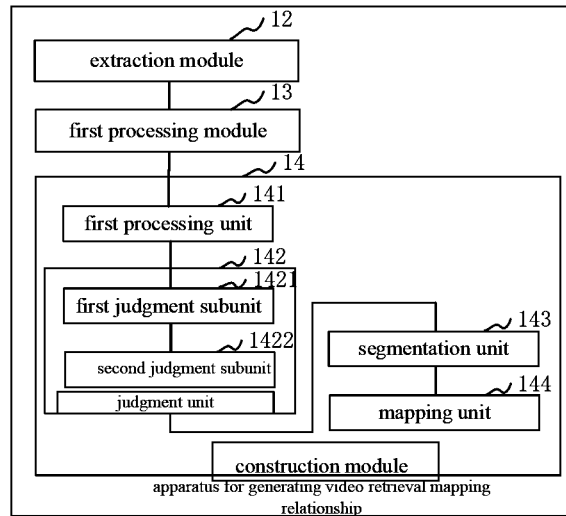
FIG. 19 is a schematic structural diagram of an apparatus for generating a video retrieval mapping relationship provided by another embodiment.

In an embodiment, on the basis of the above-mentioned embodiment shown in FIG. 17, as shown in FIG. 19, the judgment unit 142 further includes: a first judgment subunit 1421 and a second judgment subunit 1422.

Specifically, the first judgment subunit 1421 is configured to determine that the text description sequence corresponding to the previous frame picture set and the text description sequence corresponding to the next frame picture set belong to a same section in the tree-like directory structure when the second correlation is greater than or equal to the first threshold. The second judgment subunit 1422 is configured to determine that the text description sequence corresponding to the previous frame picture set and the text description sequence corresponding to the next frame picture set belong to different sections in a same chapter in the tree-like directory structure when the second correlation is greater than a second threshold and less than the first threshold.

The apparatus for generating a video retrieval mapping relationship provided by this embodiment can execute the above-mentioned method embodiments, and implementation principles and technical effects are similar, and will not be repeated herein.

Figure 20:
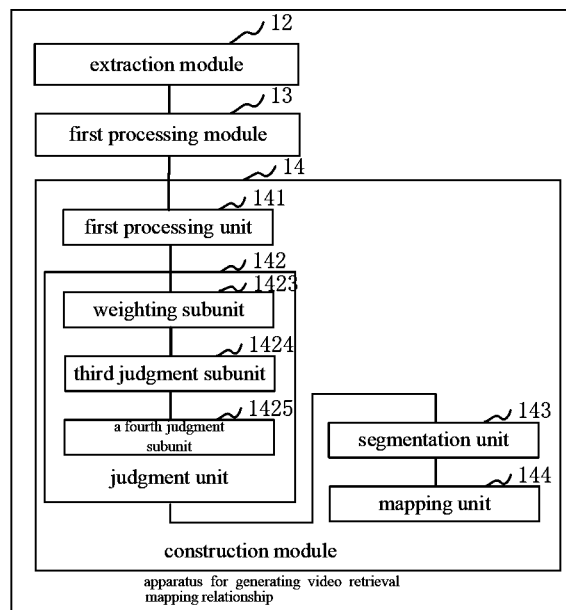
FIG. 20 is a schematic structural diagram of an apparatus for generating a video retrieval mapping relationship provided by another embodiment.
Figure 21:
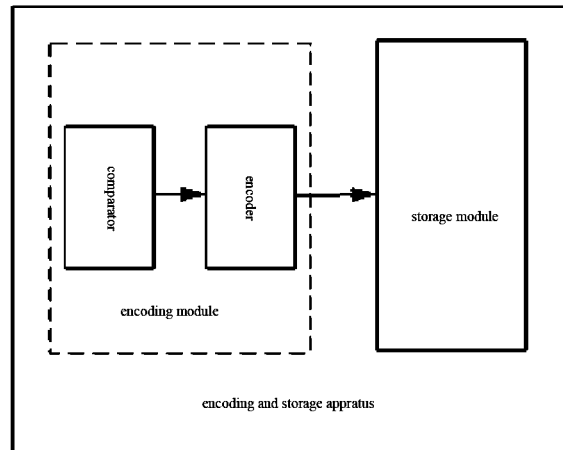
FIG. 21 is a structural block diagram of an encoding and storage apparatus in an embodiment.
Figure 22:
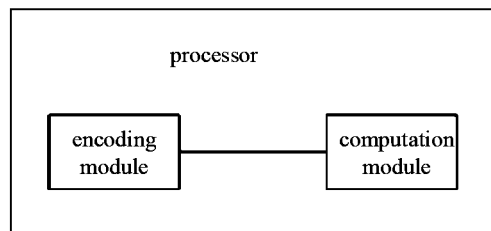
FIG. 22 is a structural block diagram of a processor in an embodiment.
Figure 23:
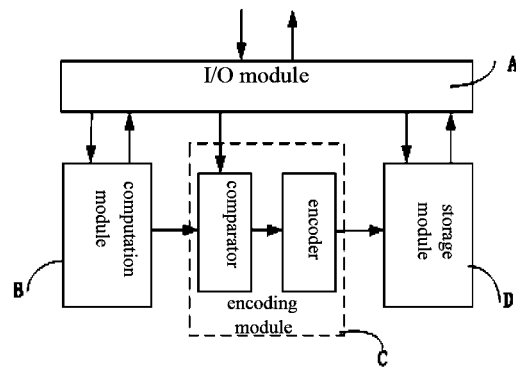
FIG. 23 is a structural block diagram of a processor in another embodiment.
Figure 24:
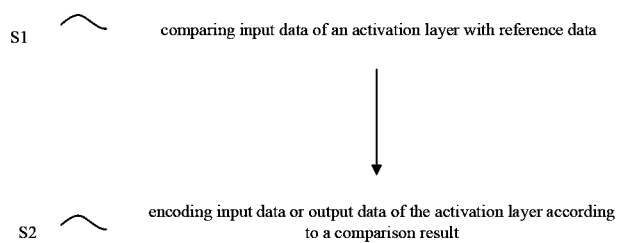
FIG. 24 is a flowchart of an encoding and storage method of convolutional neural network in an embodiment.
Figure 25:
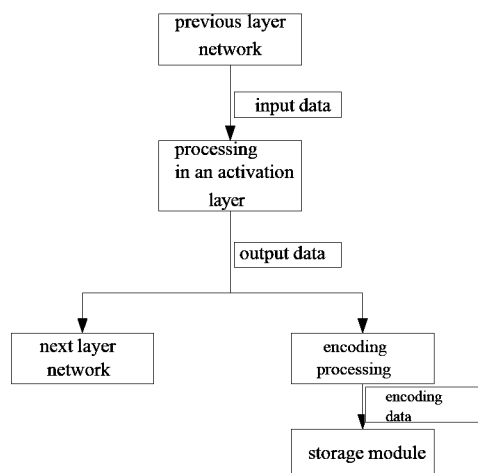
FIG. 25 is a data flow diagram of data forward propagation in an embodiment.
Figure 26:
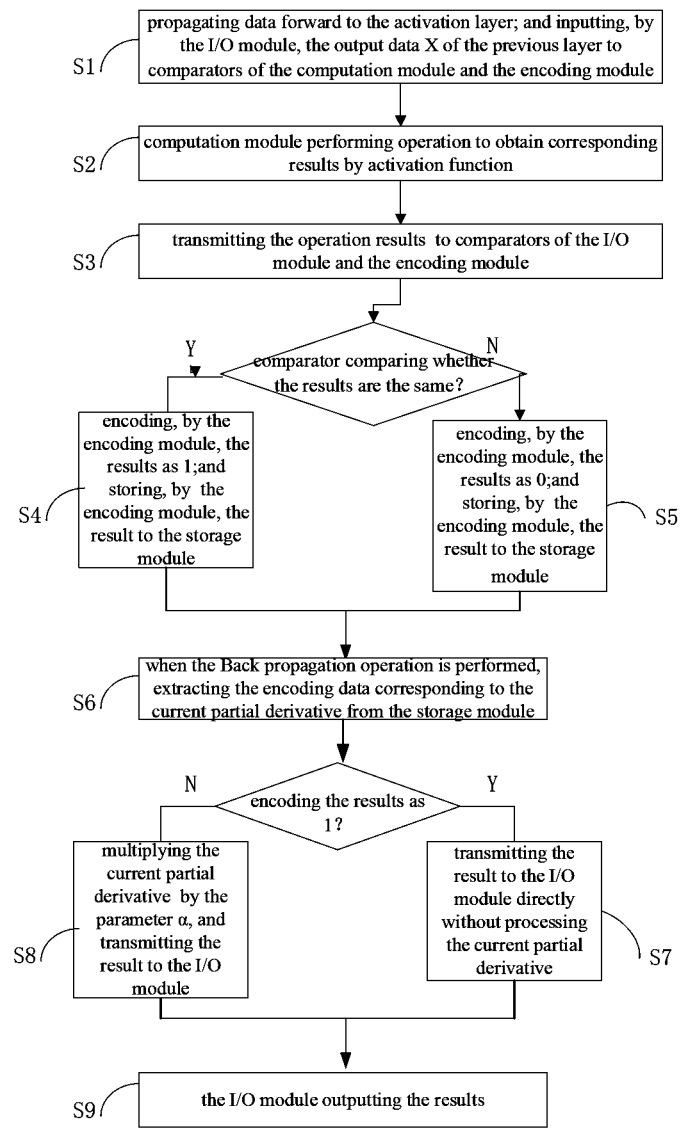
FIG. 26 is a flowchart of a training method of convolutional neural network in an embodiment.

In an embodiment, on the basis of the above-mentioned embodiment shown in FIG. 17, as shown in FIG. 20, the judgment unit 142 further includes: a weighting subunit 1423, a third judgment subunit 1424, and a fourth judgment subunit 1425.

Specifically, the weighting subunit 1423 is configured to perform the weighting operation on the first correlation and the second correlation to determine a weighted correlation. The third judgment subunit 1424 is configured to determine that the text description sequence corresponding to the previous frame picture set and the text description sequence corresponding to the next frame picture set belong to a same section in the tree-like directory structure when the weighted correlation is greater than or equal to the first threshold. The fourth judgment subunit 1425 is configured to determine that the text description sequence corresponding to the previous frame picture set and the text description sequence corresponding to the next frame picture set belong to different sections in a same chapter in the tree-like directory structure when the weighted correlation is greater than the second threshold and less than the first threshold.

The apparatus for generating a video retrieval mapping relationship provided by this embodiment can execute the above-mentioned method embodiments, and implementation principles and technical effects are similar, and will not be repeated herein.

FIG. 1a is a schematic diagram of an internal structure of a terminal provided by an embodiment. As shown in FIG. 1a, and the terminal may include a processor, a memory, a network interface, a display screen, and an input equipment which may be connected by a system bus. The processor of the terminal may be configured to provide computing and controlling capabilities. The memory of the terminal may include a nonvolatile storage medium and an internal memory. The nonvolatile storage medium may have an operating system and a computer program. The internal memory may provide an environment for the running of the operating system and the computer program in the nonvolatile storage medium. The network interface of the terminal may be configured to communicate with an external terminal via a network. When the computer program is executed by the processor, the computer program may realize the steps of the video retrieval method provided by the embodiments of the present disclosure. The display screen of the terminal may be a liquid crystal display screen or an electronic ink display screen. The input equipment of the terminal may be a touch surface layered on the display screen, and may be a button, a trackball, or a touch pad arranged on a case of the terminal, and may further be a keyboard, a touch pad, and a mouse externally connected to the terminal.

Those skilled in the art can understand that the structure shown in FIG. 1a is only a block diagram of a part of the structure related to the solutions of the present disclosure, and does not limit the terminal to which the solutions of the present disclosure are applied. A specific terminal may include more or fewer components than shown in the Figs, or combine some components, or have different component arrangements.

An embodiment provides a terminal including a memory and a processor, where a computer program is stored in the memory, and when the processor executes the computer program, the following steps are realized: obtaining a retrieval instruction which carries retrieval information for retrieving a target frame picture; and obtaining the target frame picture according to the retrieval information and a preset mapping relationship, where the mapping relationship includes a correspondence between different text description sequences and frame pictures, where a text description sequence is a sequence of text that can describe content of a frame picture.

An embodiment provides a device including a memory and a processor, where a computer program is stored in the memory, and when the processor executes the computer program, the following steps are realized: performing a feature extraction operation on each frame picture in a video stream by a feature extraction model to obtain a key feature sequence corresponding to each frame picture, where the key feature sequence includes one or more key features of the frame picture; inputting the key feature sequence corresponding to each frame picture into a text sequence extraction model for processing to obtain a text description sequence corresponding to each frame picture, where the text description sequence is a sequence of text that can describe content of a frame picture; and constructing a mapping relationship according to the text description sequence corresponding to each frame picture, where the mapping relationship includes a correspondence between different text description sequences and frame pictures.

An embodiment provides a computer-readable storage medium on which a computer program is stored, and when a processor executes the computer program, the following steps are realized: obtaining a retrieval instruction which carries retrieval information for retrieving a target frame picture; and obtaining the target frame picture according to the retrieval information and a preset mapping relationship, where the mapping relationship includes a correspondence between different text description sequences and frame pictures, where a text description sequence is a sequence of text that can describe content of a frame picture.

An embodiment provides a computer-readable storage medium on which a computer program is stored, and when a processor executes the computer program, the following steps are realized: performing a feature extraction operation on each frame picture in a video stream by a feature extraction model to obtain a key feature sequence corresponding to each frame picture, where the key feature sequence includes one or more key features of the frame picture; inputting the key feature sequence corresponding to each frame picture into a text sequence extraction model for processing to obtain a text description sequence corresponding to each frame picture, where the text description sequence is a sequence of text that can describe content of a frame picture; and constructing a mapping relationship according to the text description sequence corresponding to each frame picture, where the mapping relationship includes a correspondence between different text description sequences and frame pictures.

Convolutional Neural Network (abbreviated as CNN) is a feed-forward neural network, and artificial neurons of the CNN can respond to a part of surrounding units in coverage. In recent years, the CNN has been widely used in image processing, speech processing, pattern recognition, and other fields. The powerful availability of data resources and good parallelism of the CNN make the CNN develop rapidly and attract widespread attention. As a count of network layers increases, a demand for memory is increasing. The size of available memory is a bottleneck that limits the size of the neural network.

In the prior art, the size of a model may be usually reduced, while since weights are not the main memory occupation in neural network training, reducing the size of the model cannot effectively reduce the memory occupation. Optionally, in the prior art, data structures may be copied between the memories of the Central Processing Unit (CPU) and the Graphics Processing Unit (GPU), which will increase performance overhead In order to solve or at least partially alleviate the above-mentioned technical problems, the present disclosure provides an apparatus and method for encoding and storage of convolutional neural network, a processor of convolutional neural network, and a training method of convolutional neural network.

An embodiment of the present disclosure provides an encoding and storage apparatus of convolutional neural network. As shown in FIG. 1, the encoding and storage apparatus of convolutional neural network includes: a storage module and an encoding module. The encoding module includes a comparator and an encoder, where the comparator is configured to compare input data of an activation layer with reference data, and the encoder is configured to encode input data or output data of the activation layer according to a comparison result. The storage module is configured to store an encoding result in a feature map, store the comparison result, and store a parameter α of an activation function.

An embodiment of the present disclosure provides a processor of convolutional neural network, as shown in FIG. 2, the processor of convolutional neural network includes:

an encoding module configured to encode input data or output data of the activation layer according to a comparison result; and a computation module connected with the encoding module, configured to perform a forward propagation operation and a back propagation operation, where when performing the back propagation operation, the computation module is configured to process a partial derivative according to the encoding result; moreover, where when performing the forward propagation operation, the computation module is configured to compute the output data of the activation layer after being processed by the activation function according to the input data of the activation layer.

In an embodiment, the encoding module further includes the comparator and the encoder, where the comparator is configured to compare input data of an activation layer with reference data, and the encoder is configured to encode input data or output data of the activation layer according to a comparison result.

In an embodiment, the processor of convolutional neural network may further include the storage module configured to store the encoding result in the feature map, store the comparison result, and store the parameter α of the activation function. The encoding adopts 0/1 encoding and the encoded data is stored in bits.

In the above-mentioned embodiments, the reference data is data used as a reference for comparing a size of the input data, and specifically, the reference data is a constant or output data of the activation layer.

Optionally, if the reference data is the output data of the activation layer, the following takes ReLU and Leaky ReLU as examples to illustrate the specific process of the encoding:

if the input data and output data of the activation layer are equal, encoding the output data as 1; if the input data and output data of the activation layer are not equal, encoding the output data as 0.

If the reference data is a constant, and the value of the constant is 0, the specific process of encoding includes: if the input data is greater than 0, encoding the input data as 1; and if the input data is smaller than or equal to 0, encoding the input data as 0.

An embodiment of the present disclosure provides a processor of convolutional neural network. In addition to the encoding module, the storage module, and the computation module, the processor of convolutional neural network may further include: an I/O module used for data transfer between the activation layer and the adjacent layers, data transfer between the storage module and the computation module, and data input and output of the encoding module, the computation module, and the storage module.

Specifically, as shown in FIG. 3, the processor provided by the embodiment includes: an I/O module A, a computation module B, an encoding module C, and a storage module D. All modules can be implemented by hardware circuits.

The I/O module A, i.e., an input and output module, is used for data transfer between the activation layer and the adjacent layers (referring to adjacent network layers in the neural network, including a convolutional layer, an activation layer, a fully connected layer, etc.), transferring the input data to the computation module and the encoding module, receiving a computation result, and the data transfer during read and write operations of the storage module.

During the forward propagation process, the computation module B computes a result of the input data processed by the activation function, and transfers the result to the I/O module for back propagation; during the back propagation process, the computation module B judges an extracted encoding result (also called encoded data), where when the encoding result is 1, the computation module B transfers an input partial derivative to the I/O module and continues to propagate backward; and when the encoding result is 0, the computation module B computes a product of the current input partial derivative and a parameter α of the activation function, and then transfers a computation result to the I/O module for back propagation. The encoding method is not limited to 0/1 encoding, and the encoding method may further include a multi-value encoding or other encoding methods that occupy a plurality of bits of storage space. The encoded data can be stored in bits, and the encoding method compresses the floating-point data represented in the 32-bit to 1 bit, which effectively saves memory.

The encoding module C includes a comparator and an encoder, where the comparator compares the input data with the output data to obtain a comparison result, and then propagates the comparison result to the encoder. The encoder receives the comparison result and encodes according to the comparison result. Specifically, the following takes the ReLU or Leaky ReLU as examples to illustrate the encoding process: if a comparison result that the input data is equal to the output data (that is, the input data is greater than 0) is obtained by the encoder, encoding, by the encoder, the input data as 1, and storing encoded data to the storage module; and if a comparison result that the input data is not equal to the output data is obtained by the encoder, encoding, by the encoder, the input data as 0, and storing the encoded data to the storage module.

The storage module D stores the encoded data, the parameter α of the activation function, and other data, receives the encoded data from the encoding module, extracts the encoded data to the I/O module while waiting for back propagation, and then releases an encoding memory. The parameter α is extracted during the back propagation and participates in the computation of the partial derivative.

In the above-mentioned embodiment, during the forward propagation, the computation module computes the output data of the activation layer after being processed by the activation function according to the input data of the activation layer, and the formula is: f(x)=max(x,αx), where x represents the input data of the activation layer, f (x) represents the output data of the activation layer, and α represents the parameter of the activation function. In the formula, the activation function includes, but is not limited to a ReLU, a Leaky ReLU, a PReLU (Parametric Rectified Linear Unit), a Noisy ReLU (ReLU can be expanded to contain Gaussian noise), a MaxOut, and a ReLU with upper limit (such as ReLu6). Specifically, the activation functions in the partial derivative formula that do not depend on input and output data can be applied to the present disclosure. If the activation function is ReLU, the value of a is in the range of 0~0.35.

For example:
A mathematical expression of the ReLu is: Y=max (0, X).
A derivative formula is:

$$\frac{dY}{dX} = \begin{cases} 1 & x > 0 \\ 0 & x \le 0 \end{cases}.$$

The derivative formula is constant (1 or 0) and does not depend on input data (X) and output data (Y), so this activation method can be applied to this present disclosure.

A mathematical expression of the PReLU is:

$$pReLU(x_i) = \begin{cases} x_i & x > 0 \\ a_i x_i & x \le 0 \end{cases},$$

in this formula, i represents different channels, and if ai=0, PReLU degenerates to ReLU; if ai is a small fixed value (such as ai=0.01), PReLU degenerates to Leaky ReLU (LReLU).

A mathematical expression of the Noisy ReLU is: f(x)=max(0,x+Y), Y~N(0,σ(x)).

The activation function MaxOut has a hidden layer and can fit any convex function. A mathematical expression of the MaxOut is:

$$h_i(x) = \max_{j \in [1,k]} z_{ij}$$

where $z_{ij} = x^T W_{\ldots ij} + b_{ij}$, and $W \in \mathbb{R}^{d \times m \times k}$, in this formula, input x=(x1, x2, ... xd), that is, d neurons, the weight W is a three-dimensional matrix of size (d, m, k), and b is a two-dimensional matrix of size (m, k), and h is the output.

When performing the back propagation operation, the computation module is configured to process a partial derivative according to the encoding result. If the encoding result is 1, a current partial derivative dy is not processed, and the dy is directly transferred to the I/O module; if the encoding result is 0, the current partial derivative dy is multiplied by the parameter α of the activation function to obtain $dy_1$, and then the obtained $dy_1$ is transferred to the I/O module.

Figure 4:
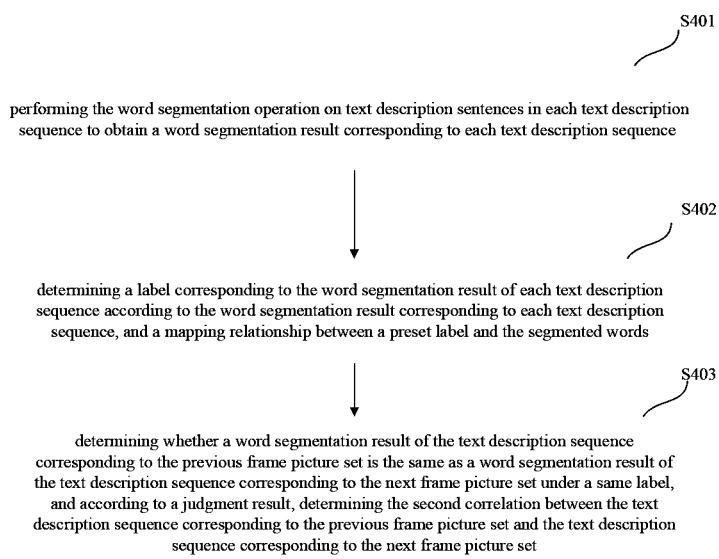
FIG. 4 is a schematic flowchart of a video retrieval method provided by another embodiment.

An embodiment of the present disclosure further provides an encoding and storage method of convolutional neural network, as shown in FIG. 4, the method includes: comparing input data of an activation layer with reference data; and encoding input data or output data of the activation layer according to a comparison result. The reference data is a constant or output data of the activation layer.

The following takes ReLU and Leaky ReLU as examples to illustrate the specific process of the encoding:

if the input data and output data of the activation layer are equal, encoding the output data as 1; if the input data and output data of the activation layer are not equal, encoding the output data as 0.

It should be noted that reference constants corresponding to the activation functions are not necessarily the same. Therefore, in actual applications, the parameter data needs to be set according to the selected activation functions.

The encoding and storage method of convolutional neural network further includes: storing the comparison result, an encoding result, and a parameter α of an activation function, where the encoding result is stored in a feature map.

An embodiment of the present disclosure further provides a training method of convolutional neural network, which includes:

encoding, by the encoding module, input data or output data in the activation layer; and when performing a back propagation operation, obtaining, by the computation module, an encoding result corresponding to a current partial derivative, and performing a partial derivative operation according to the encoding result.

The training method of convolutional neural network further includes: when performing a forward propagation operation, computing, by the computation module, the output data of the activation layer after being processed by the activation function according to the input data of the activation layer.

In an embodiment, in the training method, the encoding the input data or the output data in the activation layer by the encoding module includes:

comparing input data of an activation layer with reference data; and encoding input data or output data of the activation layer according to a comparison result.

An embodiment of the present disclosure further provides a training method of convolutional neural network, which includes:

when performing a forward propagation operation, computing the output data of the activation layer after being processed by the activation function according to the input data of the activation layer; and when performing a back propagation operation, obtaining an encoding result corresponding to a current partial derivative, and performing a partial derivative operation according to the encoding result.

In the above-mentioned embodiment, the training method further includes: outputting an operation result.

Specifically, as shown in FIG. 5 and FIG. 6, the training method of convolutional neural network includes the following steps:

S1: propagating data forward to the activation layer, where output data of a previous layer (that is, for the convolutional neural network, the previous layer in the convolutional neural network is generally a convolutional layer or a pooling layer, correspondingly, the output data of the previous layer is the data processed after a convolution operation or a pooling operation) is taken as the input data of the current activation layer, and inputting, by the I/O module, the input data to comparators of the computation module and the encoding module, and then proceeding to step S2; and S2: performing operation on the input data in the computation module by the activation function to obtain an operation result f(x), where the input data is usually a set of data, which is usually expressed in matrix form, but is not limited to matrix representation, and the input data can be represented in a linked list, a queue and other data structures, then proceeding to step S3.

Optionally, an activation method of the activation function includes, but is not limited to a ReLU, a Leaky ReLU, a PReLU (Parametric Rectified Linear Unit), a Noisy ReLU (ReLU can be expanded to contain Gaussian noise), a MaxOut, and a ReLU with upper limit (such as ReLu6). Specifically, the activation functions that do not depend on input and output data in the partial derivative formula can be applied to the present disclosure.

Specifically, each computation unit of the computation module only computes a single piece of input data each time.

The input data is set to be x, and the computation formula of the output data is as follows:

$$f(x)=\max(x,\alpha x),$$

in this formula, $\alpha$ represents the parameter of the activation function, and is a constant. Preferably, the value of a is in the range of 0~0.35. Furthermore, for the ReLU, a is set to 0.

The training method of convolutional neural network further includes the following steps:

S3: transferring the operation result f(x) to comparators of the I/O module and the encoding module; transferring, by the I/O module, the data to a next layer network (that is, the next layer network after the current layer network in the neural network, which can be a convolutional layer, a pooling layer, etc.); and comparing, by the comparators, whether the output result f(x) is equal to the data, and transferring the comparison results to the encoding module, where if the output result f(x) is equal to the data, proceeding to the step S4; if the output result f(x) is not equal to the data, proceeding to the step S5;

S4: encoding, by the comparator of the encoding module, the results to 1, and storing, by the comparator of the encoding module, the results to a corresponding position of the feature map, where the amount of encoding data that the feature map can store should be equal to the amount of data transferred to the activation layer, then proceeding to step S6;

S5: encoding, by the encoding module, the result as 0, and storing, by the encoding module, the encoded results to the feature map, then proceeding to step S6; and S6: propagating data backward to the activation layer; setting the current partial derivative to dy, and extracting encoding data in the corresponding position of the feature map according to the position of the current partial derivative dy, where if the encoding data is 1, proceeding to the step S7, and if the encoding data is not 1, proceeding to the step S8, where the position of the partial derivative dy can be obtained according to the relative address of the data structure such as matrix or array, and the position of the partial derivative dy can also be obtained by other methods.

Optionally, a partial derivative of a loss function (L) corresponding to input (x) is:

$$\frac{dL}{dx} = \frac{dL}{dy} \cdot \frac{dy}{dx} = \frac{dL}{dy}.$$

low-bit encoding matrix

The training method of convolutional neural network includes the following steps:

S7: transferring dy to the I/O module directly without processing the current partial derivative dy, then proceeding to the step S9;

S8: multiplying the current partial derivative dy by the parameter $\alpha$ of the activation function to obtain dy1, and transferring the obtained dy1 to the I/O module, then proceeding to the step S9; and S9: outputting, by the I/O module, the data.

The training method of convolutional neural network can achieve the following beneficial technical effects.

1. According to the present discourse, data in the feature map of the activation layer is encoded and stored, and the floating-point data represented in 32-bit is compressed to 1 bit, which effectively saves memory.

2. Since the input and output of the activation layer have been compared during forward propagation, it is only needed to judge the encoding result during back propagation, and the input and output results of the activation layer during forward propagation need not to be called to select the way of finding the partial derivative. In this way, the present disclosure reduces the times of inputting and outputting memory and optimizes the performance of convolutional neural network.
3. The present disclosure does not modify any parameters that affect prediction results, so the accuracy of the convolutional neural network prediction will not be affected.
4. The computing power dependence of the current layer in back propagation may be reduced.

Figure 27:
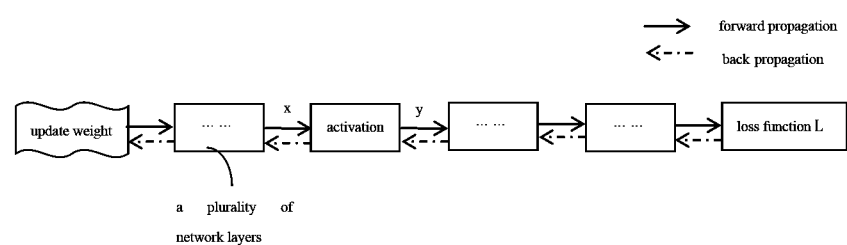
FIG. 27 is a related schematic diagram of neural network training in an embodiment.

As shown in FIG. 27, during the training process, the network layer temporarily stores the input (X) of the current layer during forward propagation for use in back propagation.

According to the training method of convolutional neural network, dependent data for back propagation is temporarily stored in the encoding module based on an encoding strategy. Therefore, after the low-bit encoding matrix is generated during the forward propagation, the input (X) of the current layer can be deleted without temporary storage. The main reason is that after the encoding strategy is adopted, during the back propagation, the computation of the derivative of input (X) of the current layer by the loss function (L) only depends on the low-bit encoding matrix, and does not depend on the input (X) and output (Y).

It should be noted that in the above-mentioned embodiments, the comparator of the encoding module compares the input data of the activation layer with the output data of the activation layer, and the encoder encodes the output data of the activation layer according to the comparison result, which is not limited in the present disclosure. The comparator of the encoding module may also compare the input data of the activation layer with reference data such as a constant, and the encoder encodes the input data of the activation layer according to the comparison result, and the effect is equivalent to the method provided by the above embodiments. That is, the present disclosure is not limited to only comparing input data with output data, nor is it limited to encoding output data.

In addition, in the present disclosure, the data in the feature map is not limited to the output data of the activation layer (data stored directly after being processed in the activation layer), but also includes the output data of the activation layer after being encoded (encoded data stored after being processed in the activation layer).

In some embodiments, the present disclosure further provides a chip including the encoding and storage apparatus or the processor.

In some embodiments, the present disclosure further provides a chip package structure including the chip.

In some embodiments, the present disclosure further provides a board card including the chip package structure.

In some embodiments, the present disclosure further provides en electronic device including the board card.

The electronic device includes a data processing apparatus, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable device, a transportation means, a household electrical appliance, and/or a medical device.

The transportation means may include an airplane, a ship, and/or a vehicle. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

It can be understood that the same or similar parts in the above-mentioned embodiments may refer to each other, and for the content that is not described in detail in some embodiments, please refer to the same or similar content in other embodiments.

It should be noted that in the description of the present disclosure, the terms "first", "second", etc. are only used for descriptive purposes, and cannot be understood as indicating or implying relative importance. In addition, in the description of the present disclosure, unless otherwise specified, the meaning of "a plurality of" means at least two.

Any process or method description in flowcharts or any process or method description described in other methods in the present disclosure may be understood as representing modules, segments, or parts of codes that include one or more executable instructions for implementing specific logical functions or steps of a process. And the scope of the preferred embodiments of the present disclosure includes additional implementations, in which the functions may not be performed in the order shown or discussed. The functions can be performed in a substantially simultaneous manner or in reverse order according to the functions involved, which should be understood by those skilled in the art to which the embodiments of the present disclosure belong.

It should be noted that each part of the present disclosure may be implemented by hardware, software, firmware, or a combination of hardware, software, and firmware. In the above-mentioned embodiments, a plurality of steps or methods may be implemented by software or firmware stored in a memory and executed by a suitable instruction execution system. For example, if the steps or methods are implemented by hardware, as in another embodiment, the steps or methods can be implemented by any one or a combination of the following technologies known in the filed: discrete logic circuits with logic gates for implementing logic functions on data signals, dedicated integrated circuits with appropriate combinational logic gates, programmable gate arrays (PGA), field programmable gate arrays (FPGA), etc.

Those skilled in the art can understand that all or part of the steps of the methods in the above-mentioned embodiments can be completed by instructing relevant hardware through programs. The programs can be stored in a computer-readable storage medium. When the programs are executed, all or part of the steps of the methods in the above-mentioned embodiments can be implemented.

In addition, each functional unit in each embodiment of the present disclosure may be integrated into one processing module, or each unit may exist independent physically, or two or more units may be integrated into one module. The integrated module may be implemented in the form of hardware or software function modules. If the integrated module is implemented in the form of a software functional module and sold or used as an independent product, the integrated module may also be stored in a computer-readable storage medium.

The above-mentioned storage medium may be a read-only memory, a magnetic disk, or an optical disk.

In the description of this specification, the description of the reference terms "an embodiment", "some embodiments", "examples", "specific examples", or "some examples" means that the specific features, structures, materials, or features described by the embodiments or examples are contained in at least one embodiment or example disclosed herein. In this specification, the schematic expression of the above terms does not necessarily refer to the same embodiment or example. Moreover, the specific features, structures, materials, or features described may be combined in any suitable manner in any one or more embodiments or examples.

Although the embodiments of the present disclosure have been shown and described above, it should be understood that the above-mentioned embodiments are exemplary and cannot be construed as limitations to the present disclosure. Those skilled in the art may make changes, modifications, substitutions, and variations to the above-mentioned embodiments within the scope of the present disclosure.

What is claimed is:

1. A video retrieval method, comprising:
sampling a video stream to obtain a plurality of frame pictures contained in the video stream;
performing a feature extraction operation on each frame picture by using a feature extraction model to obtain a key feature sequence corresponding to each frame picture, wherein the key feature sequence includes at least one key feature of the frame picture;
inputting the key feature sequence corresponding to each frame picture into a text sequence extraction model for processing to obtain a text description sequence corresponding to each frame picture;
constructing the mapping relationship according to the text description sequence corresponding to each frame picture;
obtaining a retrieval instruction which carries retrieval information used for retrieving a target frame picture; and
obtaining the target frame picture according to the retrieval information and a preset mapping relationship, wherein the mapping relationship includes a correspondence between different text description sequences and frame pictures, where the text description sequences are sequences of text describing content of a frame picture.

2. The video retrieval method of claim 1, wherein the text description sequence includes at least a text description sentence describing the frame picture, and the text description sentence includes a plurality of pieces of text describing content of the frame picture.

3. The video retrieval method of claim 2, wherein after performing the feature extraction operation on each frame picture by using the feature extraction model to obtain the key feature sequence corresponding to each frame picture, the video retrieval method further includes:
computing a first correlation between the key feature sequence corresponding to a previous frame picture set and the key feature sequence corresponding to a next frame picture set.

4. The video retrieval method of claim 3, wherein the constructing the mapping relationship according to the text description sequence corresponding to each frame picture includes:
computing a second correlation between the text description sequence corresponding to the previous frame picture set and the text description sequence corresponding to the next frame picture set in all text description sequences;
determining a chapter attribute of the text description sequence corresponding to the previous frame picture set and the text description sequence corresponding to the next frame picture set according to comparison results of the second correlation with a preset first threshold and a preset second threshold;
classifying all text description sequences into a tree-like directory structure according to the chapter attribute of the text description sequence corresponding to the previous frame picture set and the text description sequence corresponding to the next frame picture set among all the text description sequences; and
according to the tree-like directory structure and the text description sequence corresponding to each frame picture, constructing the mapping relationship based on the chapter attribute.

5. The video retrieval method of claim 4, wherein the computing the second correlation between the text description sequence corresponding to the previous frame picture set and the text description sequence corresponding to the next frame picture set in all text description sequences includes:
performing a word segmentation operation on the text description sentence in each text description sequence to obtain a word segmentation result corresponding to each text description sequence, wherein the word segmentation result includes a plurality of segmented words;
determining a label corresponding to the word segmentation result of each text description sequence according to the word segmentation result corresponding to each text description sequence and a mapping relationship between a preset label and the segmented words, wherein the label includes a people label, a time label, a place label, and an event label; and
determining whether a word segmentation result of the text description sequence corresponding to the previous frame picture set is the same as a word segmentation result of the text description sequence corresponding to the next frame picture set under a same label, and according to a judgment result, determining the second correlation between the text description sequence corresponding to the previous frame picture set and the text description sequence corresponding to the next frame picture set.

6. The video retrieval method of claim 4, wherein the determining the chapter attribute of the text description sequence corresponding to the previous frame picture set and the text description sequence corresponding to the next frame picture set according to comparison results of the second correlation with the preset first threshold and the preset second threshold includes:
determining that the text description sequence corresponding to the previous frame picture set and the text description sequence corresponding to the next frame picture set belong to a same section in the tree-like directory structure when the second correlation is greater than or equal to the first threshold; and
determining that the text description sequence corresponding to the previous frame picture set and the text description sequence corresponding to the next frame picture set belong to different sections in the same chapter in the tree-like directory structure when the second correlation is greater than the second threshold and less than the first threshold.

7. The video retrieval method of claim 6, wherein the obtaining the target frame picture according to the retrieval information and the preset mapping relationship includes:
  obtaining retrieval information at a first level and retrieval information at a second level in the retrieval information;
  according to the retrieval information at the first level, retrieving the tree-like directory structure contained in the mapping relationship based on the chapter attribute to determine a target chapter corresponding to the retrieval information;
  determining a target section from the target chapter according to the retrieval information at the second level; and
  obtaining the target frame picture according to the text description sequence corresponding to the target section and the mapping relationship based on the chapter attribute.

8. The video retrieval method of claim 4, wherein the determining the chapter attribute of the text description sequence corresponding to the previous frame picture set and the text description sequence corresponding to the next frame picture set according to comparison results of the second correlation with the preset first threshold and the preset second threshold includes:
  performing a weighting operation on the first correlation and the second correlation to determine a weighted correlation;
  determining that the text description sequence corresponding to the previous frame picture set and the text description sequence corresponding to the next frame picture set belong to the same section in the tree-like directory structure when the weighted correlation is greater than or equal to the first threshold; and
  determining that the text description sequence corresponding to the previous frame picture set and the text description sequence corresponding to the next frame picture set belong to different sections in the same chapter in the tree-like directory structure when the weighted correlation is greater than the second threshold and less than the first threshold.

9. A device for constructing a video retrieval mapping relationship, comprising an extraction module, a first processing module, and a construction module, wherein
  the extraction module is configured to perform a feature extraction operation on a plurality of frame pictures in videos to be retrieved to obtain a key feature sequence corresponding to each frame picture, wherein the key feature sequence includes one or more key features of the frame picture;
  the first processing module is configured to input the key feature sequence corresponding to each frame picture into a text sequence extraction model for processing to obtain a text description sequence corresponding to each frame picture; and
  the construction module is configured to construct a mapping relationship according to the text description sequence corresponding to each frame picture, wherein the mapping relationship is used to obtain a target frame picture when the videos to be retrieved are retrieved.

10. The device for constructing a video retrieval mapping relationship of claim 9, wherein the construction module includes a first processing unit, a judgment unit, a segmentation unit, and a mapping unit, wherein
  the first processing unit is configured to compute a second correlation according to the text description sequence corresponding to two adjacent pictures in the videos to be retrieved;
  the judgment unit is configured to determine a chapter attribute of each frame picture in the videos to be retrieved according to the second correlation;
  the segmentation unit is configured to segment the videos to be retrieved according to the chapter attribute of each frame picture in the videos to be retrieved to obtain a tree-like directory structure; and
  the mapping unit is configured to construct the mapping relationship according to the tree-like directory structure and the text description sequence corresponding to each frame picture.

11. A method for generating a video retrieval mapping relationship, comprising:
  performing a feature extraction operation on each frame picture in a video stream by using a feature extraction model to obtain a key feature sequence corresponding to each frame picture, wherein the key feature sequence includes one or more key features of the frame picture;
  inputting the key feature sequence corresponding to each frame picture into a text sequence extraction model for processing to obtain a text description sequence corresponding to each frame picture, wherein the text description sequence is a sequence of text describing content of a frame picture; and
  constructing a mapping relationship according to the text description sequence corresponding to each frame picture, wherein the mapping relationship includes a correspondence between different text description sequences and frame pictures.

12. The method for generating a video retrieval mapping relationship of claim 11, wherein before performing the feature extraction operation on each frame picture in the video stream by using the feature extraction model to obtain the key feature sequence corresponding to each frame picture, the method for generating a video retrieval mapping relationship further includes:
  inputting first training input data in a first training data set to a first initial neural network model to obtain first forward output data, wherein the first training data set includes the first training input data and first training output data, and the first training input data includes training frame pictures, and the first training output data includes key feature sequences corresponding to the training frame pictures;
  adjusting weights and biases in the first initial neural network model according to an error between the first forward output data and the first training output data corresponding to the first training input data until an error between the first forward output data and the first training output data is less than or equal to a first threshold so as to obtain a first adjusted neural network model; and
  determining the first adjusted neural network model as the feature extraction model.

13. The method for generating a video retrieval mapping relationship of claim 11, wherein before inputting the key feature sequence corresponding to each frame picture into the text sequence extraction model for processing to obtain the text description sequence corresponding to each frame picture, the method for generating a video retrieval mapping relationship further includes:
  inputting second training input data in a second training data set to a second initial neural network model to obtain second forward output data, wherein the second training data set includes second training input data and second training output data, and the second training input data includes training key feature sequences, and the second training output data includes training text description sequence corresponding to the training key feature sequences;

adjusting weights and biases in the second initial neural network model according to an error between the second forward output data and the second training output data corresponding to the second training input data until the error between the second forward output data and the second training output data is less than or equal to a second threshold so as to obtain a second adjusted neural network model; and determining the second adjusted neural network model as the text sequence extraction model.

* * * * *